(12) United States Patent
Nakaura

(10) Patent No.: US 11,072,357 B2
(45) Date of Patent: Jul. 27, 2021

(54) MOVING BODY

(71) Applicant: SHARP KABUSHIKI KAISHA, Sakai (JP)

(72) Inventor: Masaki Nakaura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/357,237

(22) Filed: Mar. 18, 2019

(65) Prior Publication Data

US 2019/0291760 A1 Sep. 26, 2019

(30) Foreign Application Priority Data

Mar. 20, 2018 (JP) .............................. JP2018-053266

(51) Int. Cl.
| | |
|---|---|
| *B62D 1/24* | (2006.01) |
| *B62B 3/00* | (2006.01) |
| *G01S 13/931* | (2020.01) |
| *B62B 5/00* | (2006.01) |
| *B62B 3/12* | (2006.01) |

(52) U.S. Cl.
CPC ............ *B62B 3/005* (2013.01); *B62B 5/0006* (2013.01); *B62B 5/0046* (2013.01); *B62B 5/0069* (2013.01); *G01S 13/931* (2013.01); *B62B 3/12* (2013.01); *B62B 5/0059* (2013.01); *G05D 2201/0216* (2013.01)

(58) Field of Classification Search
CPC ......... B62B 3/005; B62B 3/12; B62B 5/0006; B62B 5/0046; B62B 5/0069; B62B 5/0059; G01S 13/931; G01S 17/936; G01S 7/4817; G05D 2201/0216; B60R 19/00; B60R 19/02; B60R 19/023; B60R 19/04; B60R 19/18; B60R 19/42; B60R 19/44; B60R 19/48; B60R 19/483

See application file for complete search history.

(56) References Cited

U.S. PATENT DOCUMENTS

| | | | | |
|---|---|---|---|---|
| 4,077,535 A | * | 3/1978 | Oriol ................... | A61G 12/001 180/14.1 |
| 4,345,662 A | * | 8/1982 | Deplante .................. | B60T 7/18 180/168 |
| 4,397,372 A | * | 8/1983 | De Kraker ............ | B60R 19/483 180/277 |
| 4,496,274 A | * | 1/1985 | Pipes .................. | B60L 15/2036 414/340 |
| 4,657,463 A | * | 4/1987 | Pipes ....................... | B62D 1/24 180/167 |
| 4,802,548 A | * | 2/1989 | Kausch .................. | B60K 28/00 180/274 |
| 4,819,758 A | * | 4/1989 | Greene ................ | G05D 1/0255 180/168 |

(Continued)

FOREIGN PATENT DOCUMENTS

JP 2015-185130 A 10/2015

*Primary Examiner* — James M Dolak
(74) *Attorney, Agent, or Firm* — ScienBiziP, P.C.

(57) ABSTRACT

A moving body includes a travel drive section, and a transporting section that is disposed above the travel drive section (a drive housing and a power housing). In the moving body, the transporting section has a substantially rectangular shape and is provided with a vertical bumper at any of corner portions in top view, the vertical bumper extending in a height direction.

12 Claims, 18 Drawing Sheets

(56) References Cited

U.S. PATENT DOCUMENTS

| | | | |
|---|---|---|---|
| 4,861,220 A * | 8/1989 | Smith | B23Q 7/1442 414/495 |
| 4,893,693 A * | 1/1990 | Hachmann | B60T 7/22 180/275 |
| 4,958,068 A * | 9/1990 | Pong | B60R 19/02 180/167 |
| 4,972,917 A * | 11/1990 | Matsumoto | B62D 1/28 180/168 |
| 5,014,811 A * | 5/1991 | Valencic | G01S 17/04 180/286 |
| 5,023,790 A * | 6/1991 | Luke, Jr. | G05B 19/41865 180/168 |
| 5,335,951 A * | 8/1994 | Neri | B60T 7/22 180/279 |
| 5,658,120 A * | 8/1997 | Watanabe | B23Q 7/1436 414/495 |
| 5,988,306 A * | 11/1999 | Ooishi | B62D 1/28 180/168 |
| 6,345,217 B1 * | 2/2002 | Zeitler | G05D 1/0261 318/587 |
| 6,739,635 B2 * | 5/2004 | Byun | B60R 19/28 293/117 |
| 7,008,164 B2 * | 3/2006 | Rokkaku | B60L 15/38 414/530 |
| 7,031,805 B2 * | 4/2006 | Lee | G05D 1/0242 700/245 |
| 7,751,940 B2 * | 7/2010 | Lee | G05D 1/0227 700/255 |
| 7,894,939 B2 * | 2/2011 | Zini | G05B 19/41895 700/245 |
| 7,996,109 B2 * | 8/2011 | Zini | G06K 7/0008 700/245 |
| 8,121,730 B2 * | 2/2012 | Sung | G05D 1/0227 700/253 |
| 8,447,448 B2 * | 5/2013 | Scheuerman | G05D 1/0265 701/22 |
| 8,458,854 B2 * | 6/2013 | Schneider | G05D 1/0227 15/325 |
| 8,508,329 B2 * | 8/2013 | Veenstra | G05D 1/0227 340/1.1 |
| 10,059,292 B2 * | 8/2018 | Kuga | B60R 19/483 |
| 10,070,764 B2 * | 9/2018 | Schnittman | B60L 15/2036 |
| 10,108,193 B2 * | 10/2018 | Wernersbach | G05D 1/0212 |
| 10,286,883 B2 * | 5/2019 | Fujiwara | B60L 7/24 |
| 10,434,924 B2 * | 10/2019 | Alfaro | B60P 1/48 |
| 10,795,368 B2 * | 10/2020 | Wernersbach | G05D 1/0297 |
| 2005/0281653 A1 * | 12/2005 | Channel | B62B 5/0026 414/498 |
| 2006/0149419 A1 * | 7/2006 | Ogawa | B25J 5/007 700/245 |
| 2017/0080886 A1 | 3/2017 | Kuga et al. | |

* cited by examiner

MOVING BODY

BACKGROUND

1. Field

The present disclosure relates to a moving body.

2. Description of the Related Art

In recent years, in order to make operations more efficient, an automatic guided vehicle (AGV) that transports an article has been increasingly used. Since such an automatic guided vehicle is not operated by a human being, such an automatic guided vehicle includes a mechanism for detecting an obstacle in a path and reducing occurrence of collision with the obstacle. However, when, for example, a human being is moving around in the vicinity of the automatic guided vehicle, an accident may occur suddenly. Therefore, a structure including a bumper for providing against a collision is proposed (refer to, for example, Japanese Unexamined Patent Application Publication No. 2015-185130).

The automatic guided vehicle described in Japanese Unexamined Patent Application Publication No. 2015-185130 includes an elastic lattice bumper and an obstacle sensor including a light-emitting section and a light-receiving section, and determines whether or not the lattice bumper has been deformed on the basis of light from the light-emitting section that illuminates and that is reflected by the lattice bumper. In the above-described automatic guided vehicle, a placement table on which a transport object is placed is provided at a low position, as a result of which there may be a constraint in that space for the base portion that accommodates the wheels and the drive source becomes narrow. In addition, the lattice bumper is provided at the base portion situated below the front portion; however, collision against the front portion may not be considered.

Accordingly, it is desirable to provide a moving body in which collision at a height slightly away from the ground is considered.

SUMMARY

According to an aspect of the disclosure, there is provided a moving body including a travel drive section, and a transporting section that is disposed above the travel drive section. In the moving body, the transporting section has a substantially rectangular shape and is provided with a vertical bumper at any of corner portions in top view, the vertical bumper extending in a height direction.

DESCRIPTION OF THE EMBODIMENTS

First Embodiment

A moving body according to a first embodiment of the present disclosure is described below with reference to the drawings.

Figure 1:
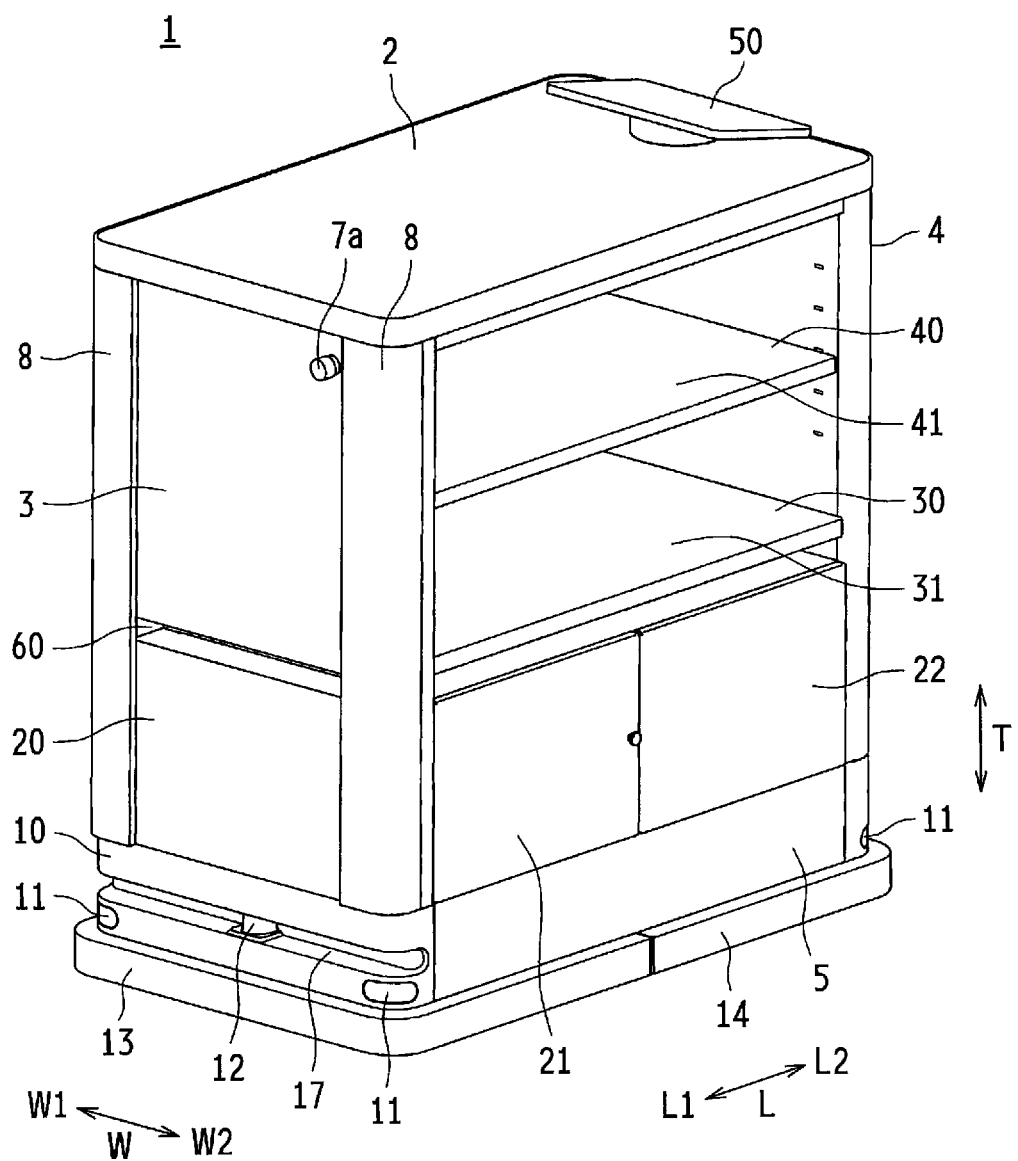
FIG. 1 is an external perspective view of a moving body according to a first embodiment of the present disclosure when seen obliquely leftward from the front.
Figure 2:
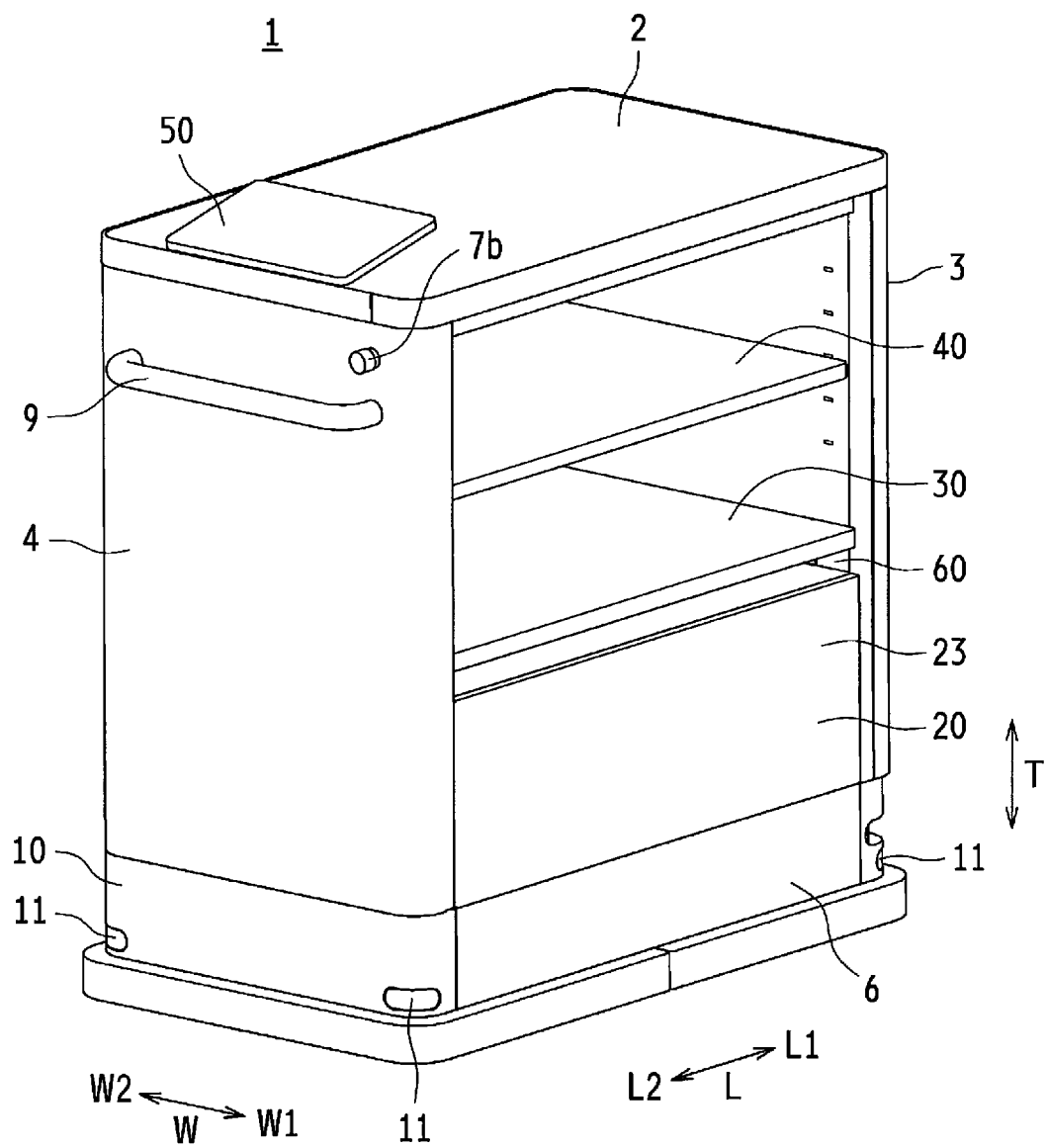
FIG. 2 is an external perspective view of the moving body shown in FIG. 1 when seen obliquely rightward from the rear.
Figure 3A:
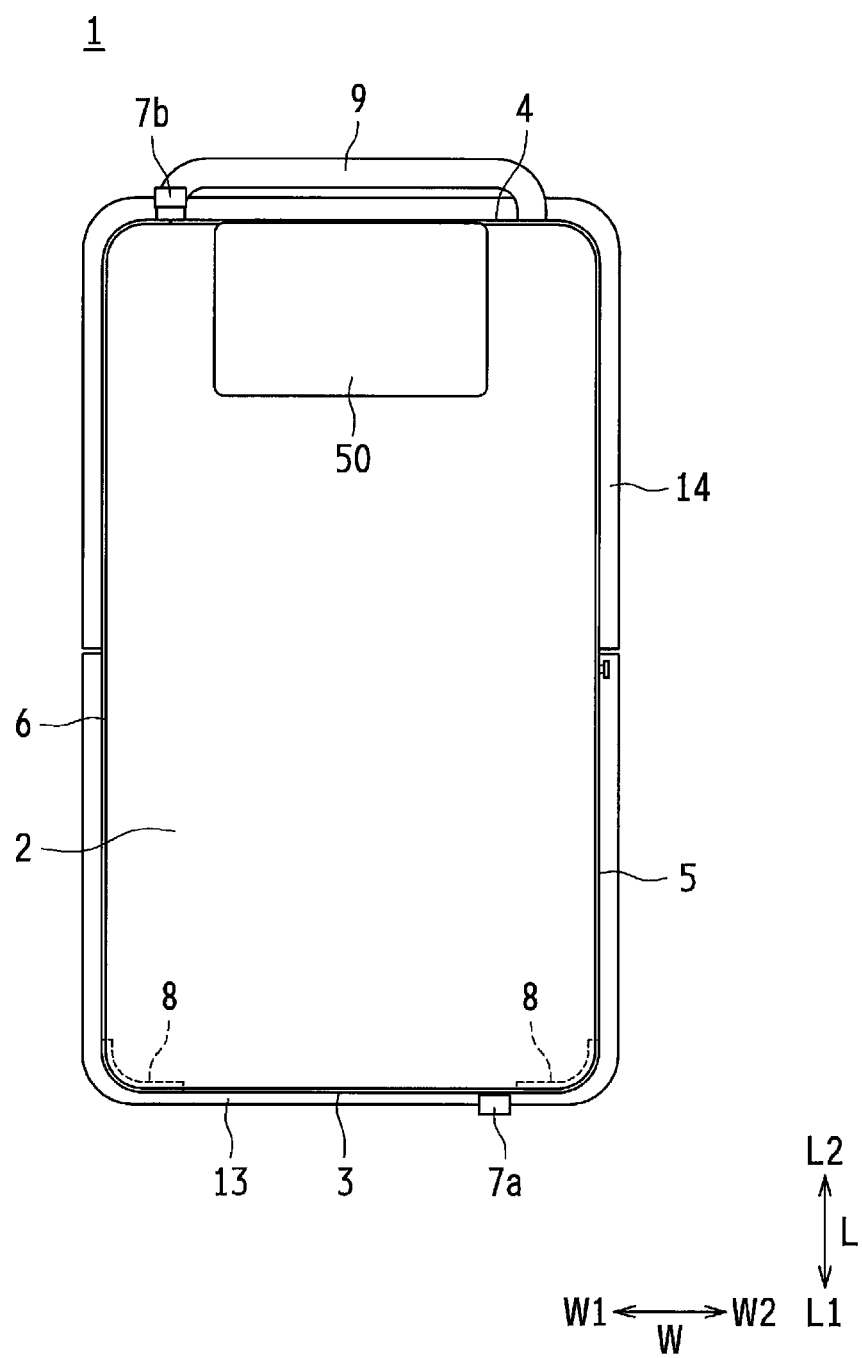
FIG. 3A is a schematic top view of the moving body shown in FIG. 1.
Figure 3B:
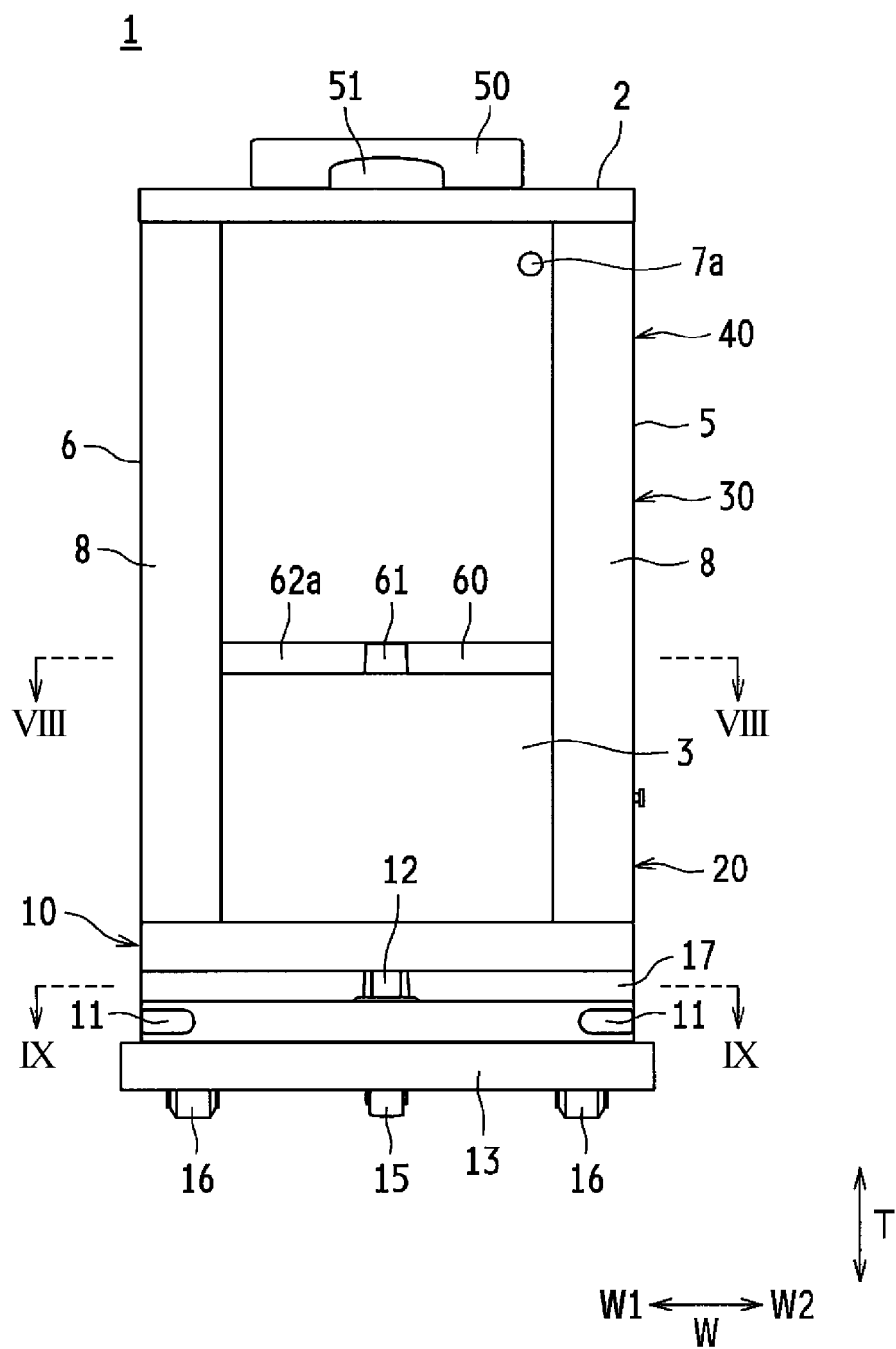
FIG. 3B is a schematic side view of the moving body shown in FIG. 1 when seen from the front.
Figure 3C:
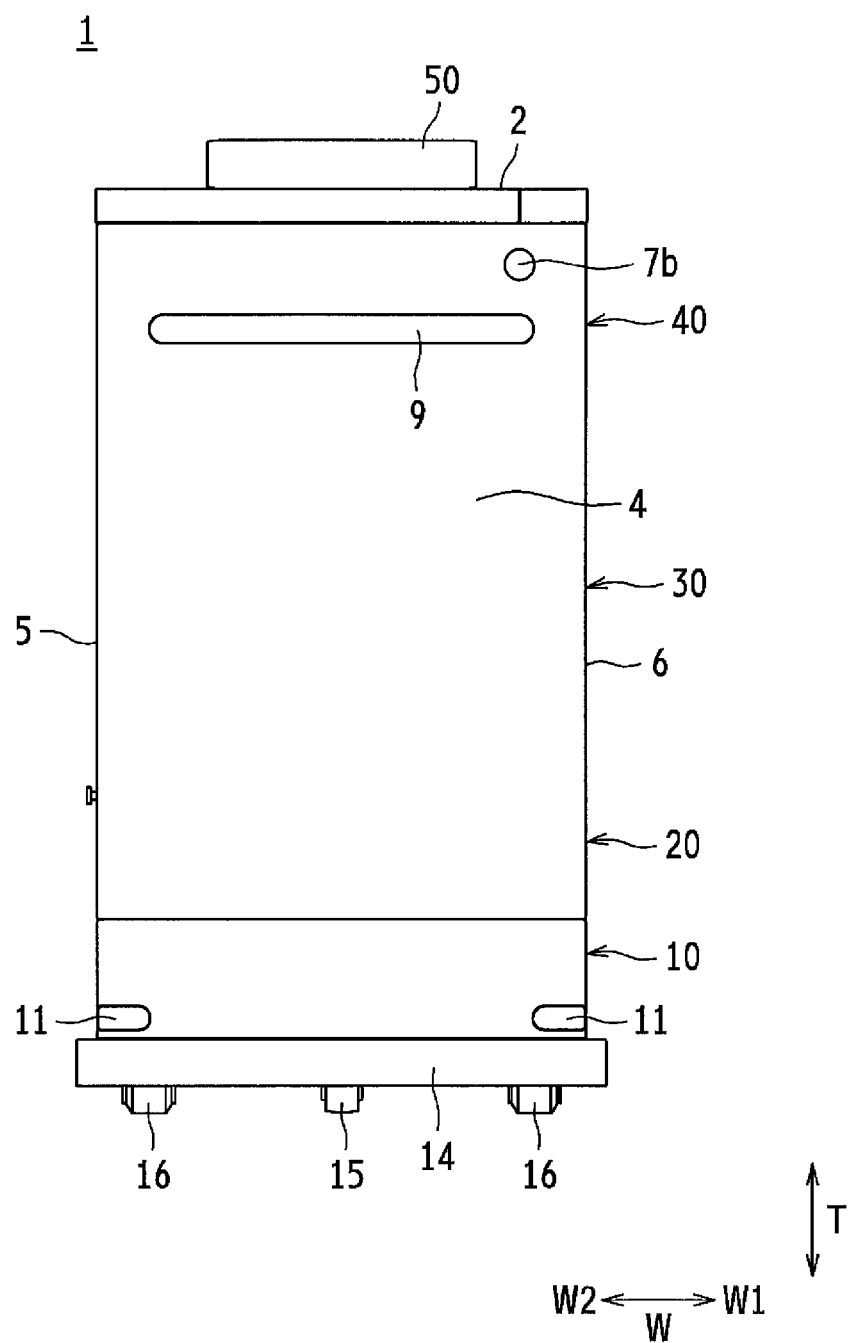
FIG. 3C is a schematic side view of the moving body shown in FIG. 1 when seen from the rear.
Figure 3D:
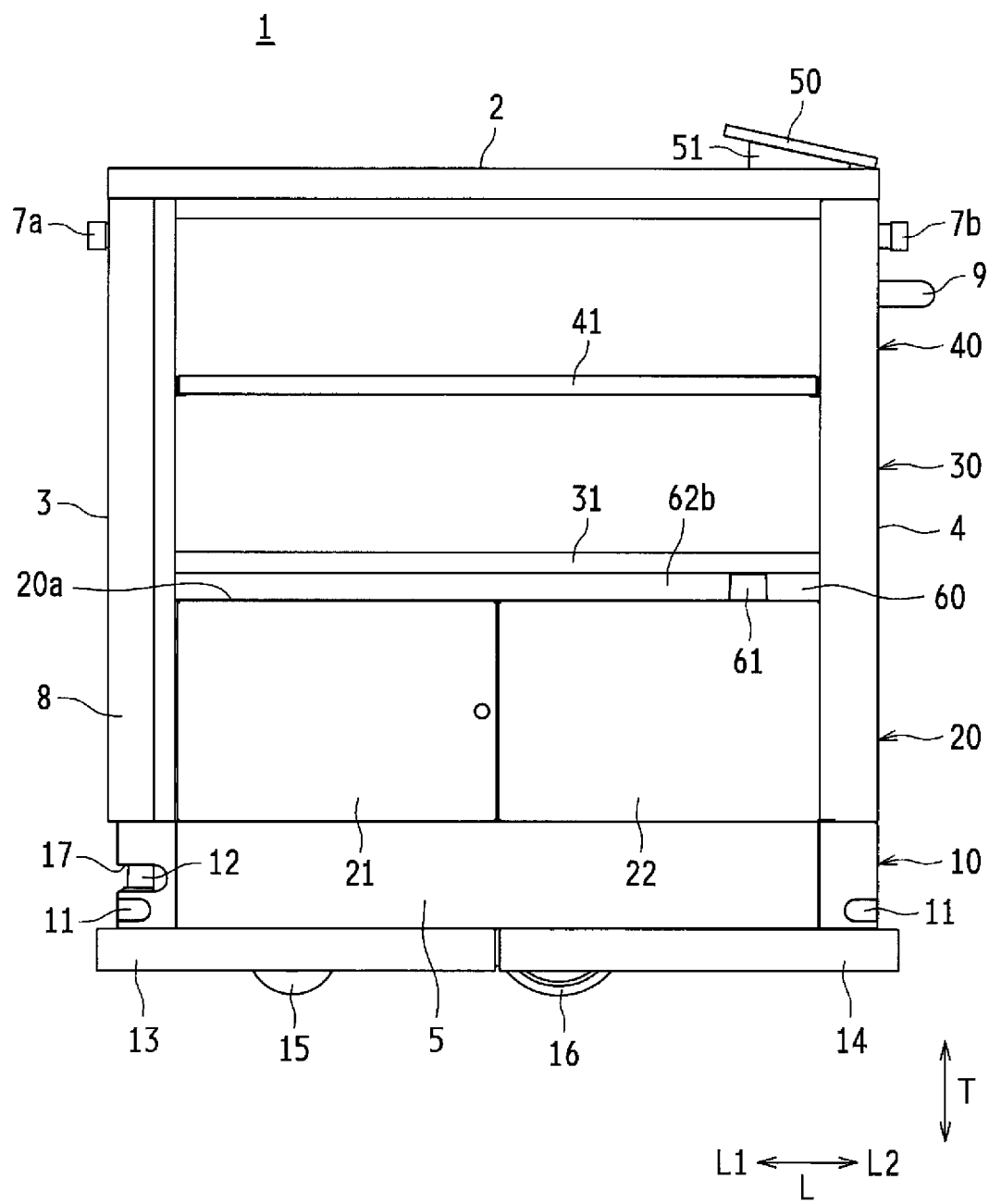
FIG. 3D is a schematic side view of the moving body shown in FIG. 1 when seen from the left.
Figure 3E:
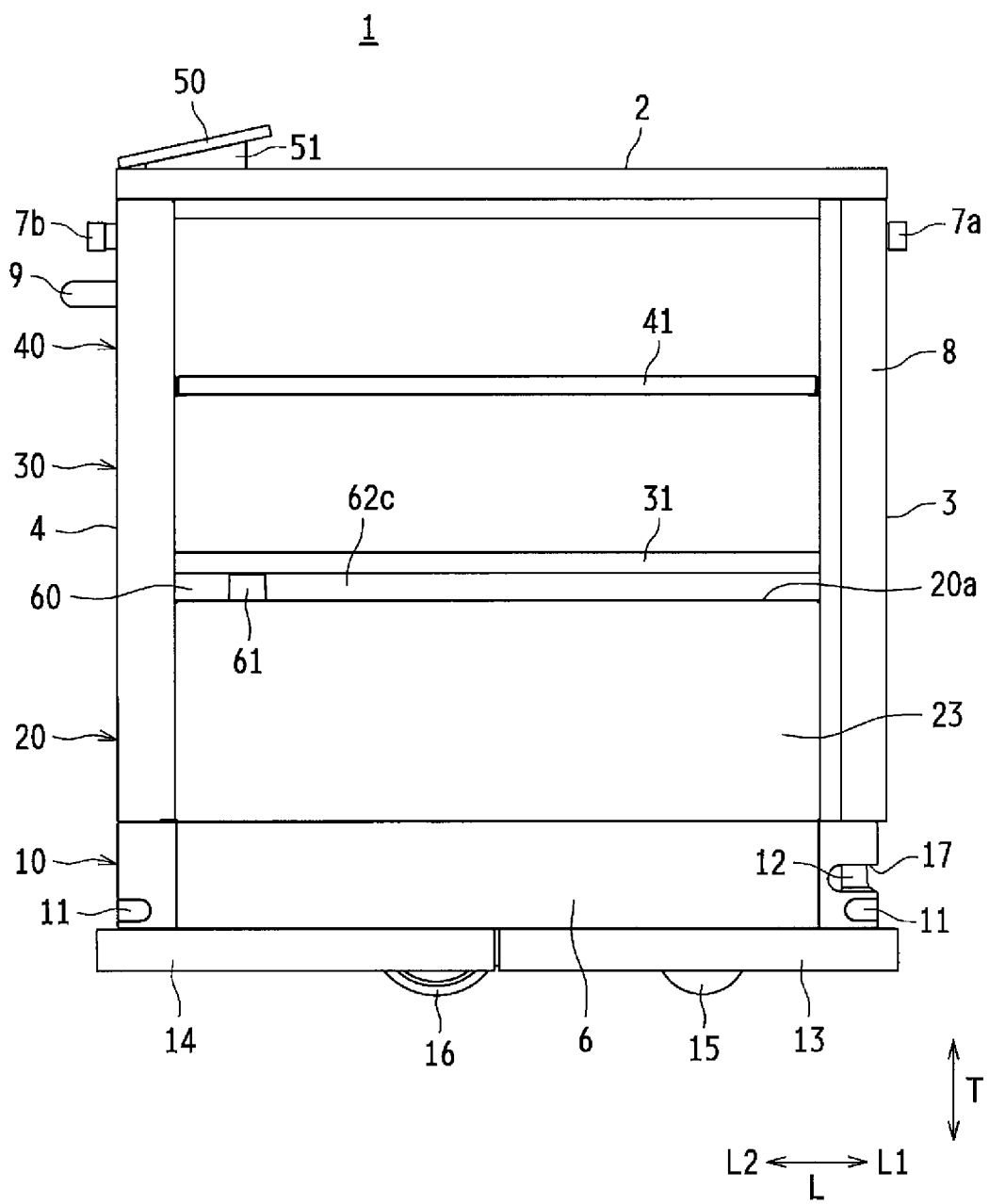
FIG. 3E is a schematic side view of the moving body shown in FIG. 1 when seen from the right.

FIG. 1 is an external perspective view of a moving body according to a first embodiment of the present disclosure when seen obliquely leftward from the front. FIG. 2 is an external perspective view of the moving body shown in FIG. 1 when seen obliquely rightward from the rear. FIG. 3A is a schematic top view of the moving body shown in FIG. 1. FIG. 3B is a schematic side view of the moving body shown in FIG. 1 when seen from the front. FIG. 3C is a schematic side view of the moving body shown in FIG. 1 when seen from the rear. FIG. 3D is a schematic side view of the moving body shown in FIG. 1 when seen from the left. FIG. 3E is a schematic side view of the moving body shown in FIG. 1 when seen from the right.

The moving body 1 (AGV) according to the first embodiment of the present disclosure has a substantially rectangular shape. In the moving body 1, a transporting section (a first transporting housing 30 and a second transporting housing 40) is disposed above a travel drive section (a drive housing 10 and a power housing 20). Ordinarily, the moving body 1 moves in a straight line towards the front (lower side in FIG. 3A) and changes its direction of travel as appropriate.

In top view (see FIG. 3A), the travel drive section and the transporting section that are stacked upon each other in a height direction T have substantially the same shape, and each have a rectangular shape in which a length in length directions L in which a front surface 3 and a rear surface 4 face each other is greater than a length in width directions W along which a left side surface 5 and a right side surface 6 face each other. Hereunder, for the purpose of explanation, of the width directions W, the direction towards the right side surface 6 is sometimes called "right direction W1", and the direction towards the left side surface 5 is sometimes called "left direction W2". Of the length directions L, the direction towards the front surface 3 is sometimes called "front direction L1", and the direction towards the rear surface 4 is sometimes called "rear direction L2".

In the present embodiment, the moving body 1 includes, in the order from the lower side, the drive housing 10, the power housing 20, the first transporting housing 30, and the second transporting housing 40, which are stacked upon each other. Next, each portion is described in detail.

The drive housing 10 is a portion closest to the ground (movement surface), includes two drive wheels 16 and one driven wheel 15, which are in contact with the ground, and accommodates motors 19 (see FIG. 7A described below) that drive the drive wheels 16. The drive wheels 16, the driven wheel 15, and the motors 19 are described in detail with reference to FIG. 7A and FIG. 7B described below.

Outer peripheral bumpers that surround an outer periphery of the drive housing 10 are provided on a lower portion of the drive housing 10. In the present embodiment, the outer peripheral bumpers are two separated bumpers, that is, a front bumper 13 and a rear bumper 14. The front bumper 13 surrounds a front-direction-L1 side of each of the front surface 3, the left side surface 5, and the right side surface 6. The rear bumper 14 surrounds a rear-direction-L2 side of each of the rear surface 4, the left side surface 5, and the right side surface 6. When either one of the outer peripheral bumper detects that an object has collided, an instruction for stopping the movement of the moving body 1 is given. Although, in the present embodiment, the outer peripheral bumpers are described as being two separated bumpers, the number of separated outer peripheral bumpers may be varied as long as the outer peripheral bumpers surround the entire periphery of the moving body 1.

Blinkers 11 are provided on four corners of the drive housing 10. The blinkers 11 are lamps that turn on as appropriate, and may indicate the direction of travel of the moving body 1 or an emergency stop of the moving body 1 by, for example, turning on, turning on and off, or remaining off.

A front-surface recessed portion 17 recessed in the rear direction L2 is provided at the front surface 3 of the drive housing 10. The front-surface recessed portion 17 is formed from an end portion on the side of the left side surface 5 to an end portion on the side of the right side surface 6. A front-surface sensor 12 is provided at the center of the front-surface recessed portion 17 in the width directions W. The front-surface sensor 12 is a 2D-LIDAR that detects an object by illuminating the object with light. The front-surface sensor 12 is described in detail with reference to FIG. 9 described below.

The power housing 20 accommodates components, such as batteries 24 and a charger 25 (see FIG. 7A described below), therein. An internal structure of the power housing 20 is, along with an internal structure of the drive housing 10, described in detail with reference to FIG. 7A and FIG. 7B described below.

The left side surface 5 at the power housing 20 is covered by a side-surface door 21 and a left panel 22. The right side surface 6 at the power housing 20 is covered by a right panel 23. Specifically, in the length directions L, the side-surface door 21 covers a front-direction-L1-side half, and the left panel 22 covers a rear-direction-L2-side half. The side-surface door 21 is openably and closably mounted. When a user holds, for example, a knob of the side-surface door 21 and opens the side-surface door 21, the inside can be exposed. The left panel 22 and the right panel 23 are mounted with, for example, screws, and can be removed as appropriate.

The first transporting housing 30 includes a first loading table 31 (an example of a loading table) on which a transport object that is transported by the moving body 1 is loaded. The first transporting housing 30 is open at the left side surface 5 and the right side surface 6. In other words, a user can insert his/her hand from either one of the left side surface 5 and the right side surface 6 to put the transport object into or remove the transport object from the first transporting housing 30.

The second transporting housing 40 has a structure that is substantially the same as the structure of the first transporting housing 30, includes a second loading table 41 (an example of a loading table) on which a transport object is loaded. The second transporting housing 40 is open at the left side surface 5 and the right side surface 6. An upper portion of the second transporting housing 40 is covered by a flat upper surface 2.

The first loading table 31 and the second loading table 41 are supported on a front-surface-3 side and a rear-surface-4 side via, for example, supporting tools, and may be made removable as appropriate. In the first transporting housing 30 and the second transporting housing 40, a front-surface-3-side inside wall and a the rear-surface-4-side inside wall may be provided with a plurality of mounting locations for the supporting tools to allow the position of the first loading table 31 and the position of the second loading table 41 in the height direction T to be adjusted.

Although, in the present embodiment, the structure in which the first transporting housing 30 and the second transporting housing 40 are provided is described, other structures are possible. The transporting section may be one in which the first transporting housing 30 and the second transporting housing 40 are integrated with each other. That is, the transporting section is one that includes wall surfaces that form the front surface 3 and the rear surface 4 and that is separated into a plurality of portions (shelves) in the height direction T by a loading table, with the portions separated by, for example, the loading table corresponding to one transporting housing. Therefore, the transporting section itself may be made larger in size by increasing its length in the height direction T or the number of loading tables may be increased to increase the number of shelves on which transport objects are loaded. Although the transporting section is open at the left side surface 5 and the right side surface 6, doors or the like that cover the left side surface 5 and the right side surface 6 may be provided. Desirably, the doors of the transporting section can each be opened and closed by a user as appropriate.

A sensor accommodating section 60 is provided between an upper surface (a power upper surface 20a) of the power housing 20 and a lower surface (the first loading table 31) of the transporting section. That is, the first loading table 31 is mounted with a gap from the power upper surface 20a in the height direction T. The sensor accommodating section 60 is provided with a wide-area sensor 61 positioned towards the rear surface 4. The wide-area sensor 61 is a 2D-LIDAR that detects an object by illuminating the object with light. At the sensor accommodating section 60, the left side surface 5 and the right side surface 6 are open. A position of the front surface 3 of the moving body 1 corresponding to the sensor accommodating section 60 in the height direction T is open (see FIG. 3A). In order to distinguish between the openings (emission window portions) of the sensor accommodating section 60, the opening of the front surface 3 is sometimes called "front-surface opening portion 62a", the opening of the left side surface 5 is sometimes called "left opening portion 62b" (an example of a side-surface opening portion), and the opening of the right side surface 6 is sometimes called "right opening portion 62c" (an example of a side-surface opening portion). The wide-area sensor 61 is described in detail with reference to FIG. 8 described below.

Vertical bumpers 8 are mounted at two corner portions of the moving body 1 on the front-surface-3 side. The vertical bumpers 8 extend in the height direction T along sides of the moving body 1, and extend over the power housing 20, the first transporting housing 30, and the second transporting housing 40. The vertical bumpers 8 are described in detail along with FIG. 6 described below.

A front stop button 7a (an example of an emergency stop button) is provided on an upper end portion of the front surface 3 of the moving body 1 towards the left side surface 5. The front stop button 7a is an emergency stop button that is operated by a user, and causes the moving body 1 to undergo an emergency stop when the front stop button 7a is operated. The moving body 1 that has undergone an emergency stop remains stopped until the user cancels the emergency stop. In the length directions L (see FIG. 3D), the front stop button 7a protrudes further in the front direction L1 than the vertical bumpers 8, and are disposed further in the rear direction L2 than the front bumper 13.

Figure 4A:
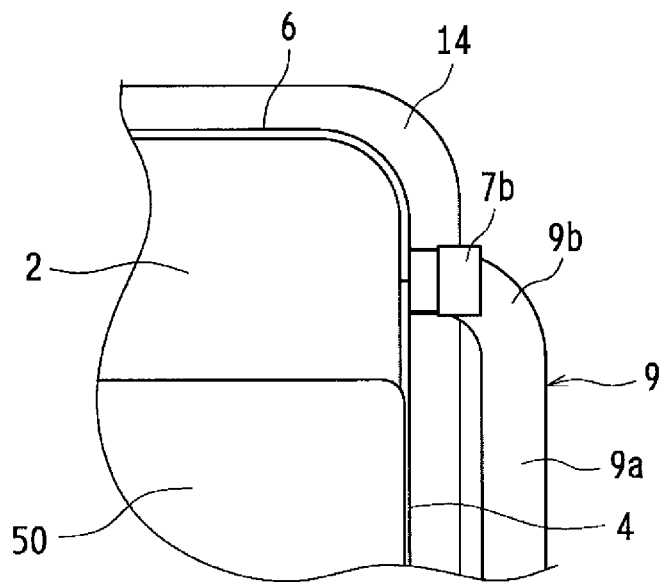
FIG. 4A is an enlarged top view of an enlarged vicinity of a rear end of an upper surface of the moving body shown in FIG. 1.
Figure 4B:
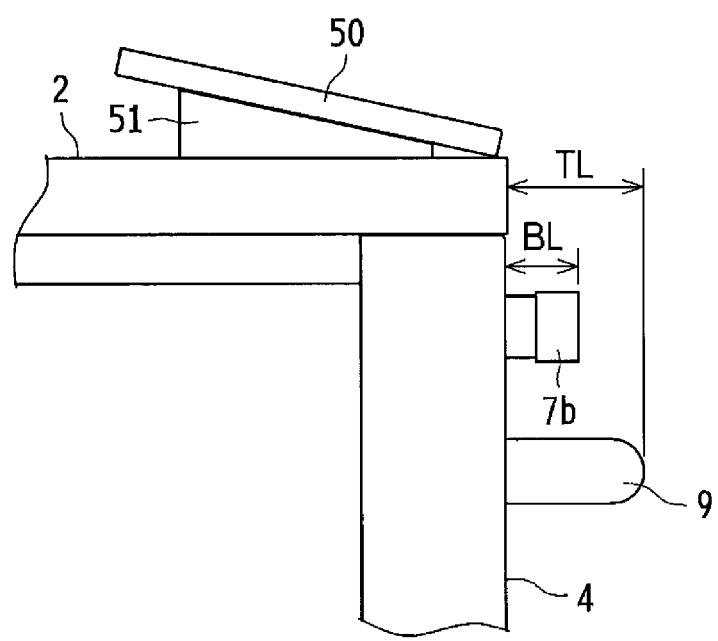
FIG. 4B is an enlarged side view of the enlarged vicinity of the rear end of the upper surface of the moving body shown in FIG. 1.

Next, a structure of an upper portion of the rear surface 4 of the moving body 1 is described along with FIG. 4A and FIG. 4B.

FIG. 4A is an enlarged top view of an enlarged vicinity of a rear end of an upper surface of the moving body shown in FIG. 1. FIG. 4B is an enlarged side view of the enlarged vicinity of the rear end of the upper surface of the moving body shown in FIG. 1.

A flat operating terminal 50 (an example of an operating section) is mounted on the rear end of the upper surface 2 of the moving body 1 via a terminal base 51. For example, the operating terminal 50 is a tablet having a touch panel and receives an instruction for the moving body 1 from a user. The operating terminal 50 is removable with respect to the terminal base 51, and is obliquely set such that the rear-surface-4 side becomes lower than the front-surface-3 side when the operating terminal 50 is mounted on the terminal base 51. The operating terminal 50 may have a structure that allows connection of, for example, a cable extending from the terminal base 51, or a structure that includes a connection portion at the terminal base 51 and that allows electrical connection when the operating terminal 50 is set.

A handle 9 that is held by a user is provided on the upper portion of the rear surface 4 of the moving body 1. The handle 9 has a structure in which a circular column is bent. In the handle 9, a handle body 9a extends in the width directions W and both ends of the handle body 9a are linked to the rear surface 4 via a handle connecting portion 9b. The user holds the handle 9 when operating the operating terminal 50 or when moving the stopped moving body 1.

A rear stop button 7b (an example of an emergency stop button) is provided on an upper end portion of the rear surface 4 of the moving body 1 towards the right side surface 6. Similarly to the front stop button 7a, the rear stop button 7b is an emergency stop button that is operated by a user. In the length directions L (see FIG. 3D), the rear stop button 7b is disposed further in the front direction L1 than the rear bumper 14. As shown in FIG. 4A, the rear stop button 7b is positioned above the handle connecting portion 9b of the handle 9. As shown in FIG. 4B, a length of protrusion of the rear stop button 7b in the rear direction L2 from the rear surface 4 (button length BL) is less than a length of protrusion of the handle 9 in the rear direction L2 from the rear surface 4 (handle length TL).

The handle 9 and the rear stop button 7b are grouped and arranged on the upper portion of the moving body 1. It is desirable that, in side view, the rear stop button 7b be disposed towards the rear surface 4 with respect to a straight line passing through an end of the handle 9 and the rear end of the upper surface 2. Since this causes the handle 9 and the rear stop button 7b to be grouped near the rear end of the upper surface 2, it is possible to reduce occurrence of unintentional operation while ensuring operability of the rear stop button 7b. In the top view, the front stop button 7a and the rear stop button 7b are positioned diagonally with reference to the center of the moving body 1.

As described above, since the operating terminal 50 is provided on the upper surface 2, it is possible to reduce occurrence of a sideward protrusion of the moving body 1, minimize the width of the moving body 1, and reduce the factors causing contact with, for example, an obstacle. By providing the operating terminal 50 on the rear side of the moving body 1, a user can operate the operating terminal 50 while standing behind the moving body 1. Therefore, it is possible to reduce accidents, such as the moving body 1 operating unexpectedly and colliding with the user.

By providing the rear stop button 7b on the rear surface 4 of the moving body 1, a user standing behind the moving body 1 can quickly operate the rear stop button 7b. Further, by providing the rear stop button 7b in correspondence with the position of the handle 9, it is possible to dispose the rear stop button 7b so as not to hinder the operation of the rear stop button 7b while reducing occurrence of unintentional operation of the rear stop button 7b.

Since the handle 9 protrudes further in the rear direction L2 than the rear stop button 7b, it is possible to reduce occurrence of a case in which the handle 9 comes into contact before the rear stop button 7b with an object with which the moving body 1 has unexpectedly collided and the rear stop button 7b is operated.

Figure 5:
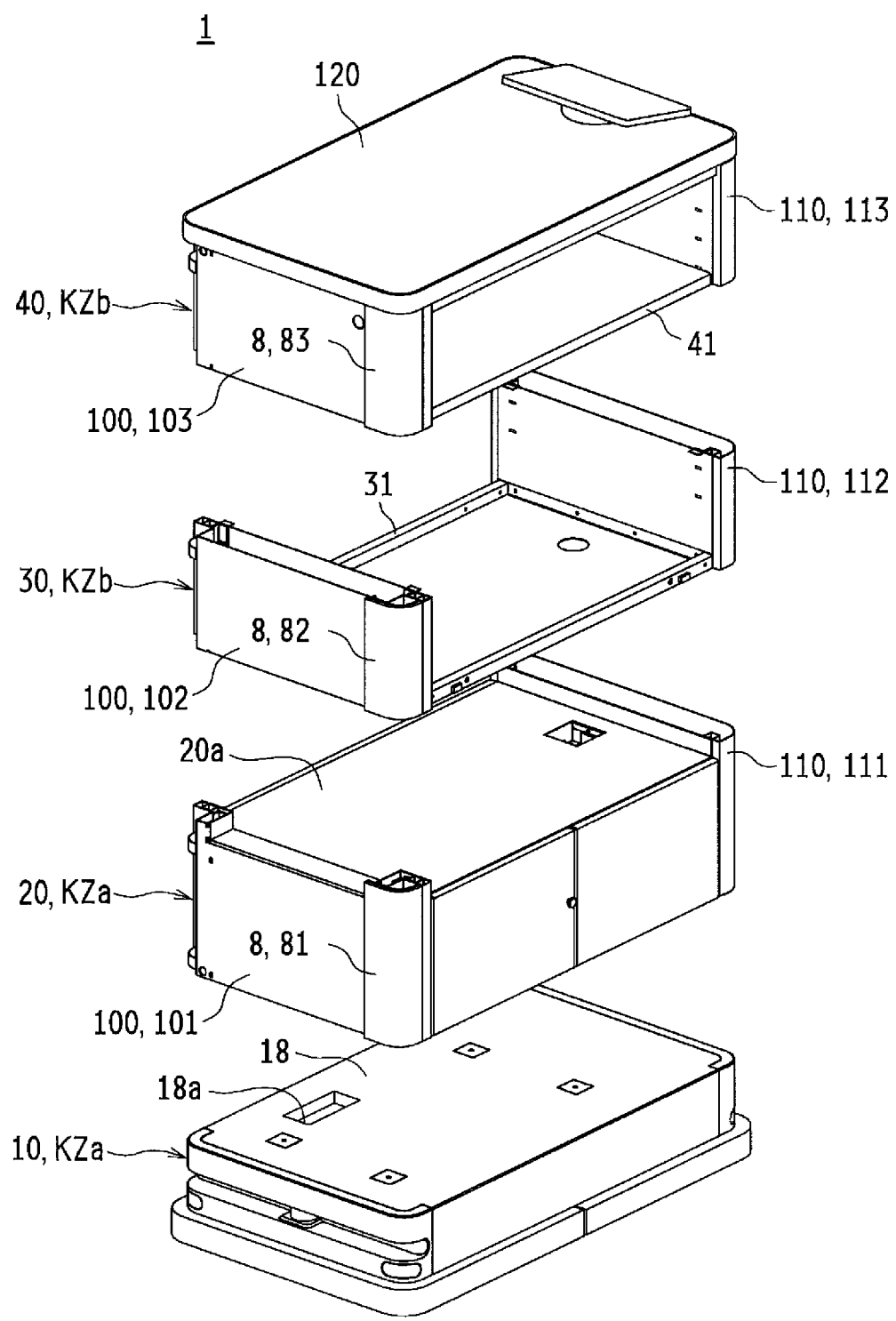
FIG. 5 is an explanatory perspective view of a state in which each portion of the moving body is separated.

FIG. 5 is an explanatory perspective view of a state in which each portion of the moving body is separated.

FIG. 5 shows the moving body 1 according to the first embodiment, and shows a state in which the drive housing 10, the power housing 20, the first transporting housing 30, and the second transporting housing 40 are separated from each other. An open connection opening 18a is provided in an upper surface (a drive upper surface 18) of the drive housing 10. The connection opening 18a is described in detail along with the internal structure of the drive housing 10 with reference to FIG. 7A and FIG. 7B described below.

Specifically, the moving body 1 includes an upper wall portion 120 that covers the upper surface 2, front wall portions 100 that cover the front surface 3, and rear wall portions 110 that cover the rear surface 4. In the first embodiment, the front wall portions 100 and the rear wall portions 110 that correspond to the power housing 20, the first transporting housing 30, and the second transporting housing 40 are separated in accordance with the corresponding portions. The front wall portions 100 are separated into a first front wall 101 corresponding to the power housing 20, a second front wall 102 corresponding to the first transporting housing 30, and a third front wall 103 corresponding to the second transporting housing 40. The rear wall portions 110 are separated into a first rear wall 111 corresponding to the power housing 20, a second rear wall 112 corresponding to the first transporting housing 30, and a third rear wall 113 corresponding to the second transporting housing 40. The first loading table 31 is mounted on a lower portion of the second front wall 102 and a lower portion of the second rear wall 112. The second loading table 41 is mounted on a lower portion of the third front wall 103 and a lower portion of the third rear wall 113.

In the present embodiment, in accordance with the three separated front wall portions 100, each vertical bumper 8 is also divided into three portions. That is, each vertical bumper 8 is divided into a first bumper structural body 81 corresponding to the power housing 20, a second bumper structural body 82 corresponding to the first transporting housing 30, and a third bumper structural body 83 corresponding to the second transporting housing 40. After the drive housing 10, the power housing 20, the first transporting housing 30, and the second transporting housing 40 have been assembled, each first bumper structural body 81, each second bumper structural body 82, and each third bumper structural body 83 are connected to each other as appropriate, as a result of which each vertical bumper 8 functions similarly to the vertical bumper 8 having an integrated structure. FIG. 5 shows a state in which the vertical bumper 8 is mounted on only the left side surface 5 of the moving body 1, and in which the vertical bumper 8 is not mounted on the right side surface 6.

In the moving body 1 according to a first structural example, the drive housing 10 and the power housing 20, which are provided below the sensor accommodating section 60, correspond to lower structural bodies KZa, and the first transporting housing 30 and the second transporting housing 40, which are provided above the sensor accommodating section 60, correspond to upper structural bodies KZb.

As described above, in the present embodiment, the front wall portion 100, the rear wall portion 110, and the vertical bumpers 8 that are separated from each other are assembled and formed in one layer, a plurality of such layers are stacked upon each other as appropriate, and members that are separated from each other in the height direction T are assembled. Therefore, flexibility can be provided when, for example, changing the number of layers.

Although, in the present embodiment, the moving body 1 includes four housings, that is, the drive housing 10, the power housing 20, the first transporting housing 30, and the second transporting housing 40, the number of housings can be changed as appropriate. For example, a housing that accommodates, for example, an auxiliary battery may be added above the power housing 20. In this case, a portion corresponding to the first transporting housing 30 may have a different structure by removing the first loading table 31 and inserting, for example, an auxiliary battery instead. A second embodiment and a third embodiment whose structures differ from that of the first embodiment are described in detail with reference to FIG. 10A to FIG. 11B described below.

Figure 6:
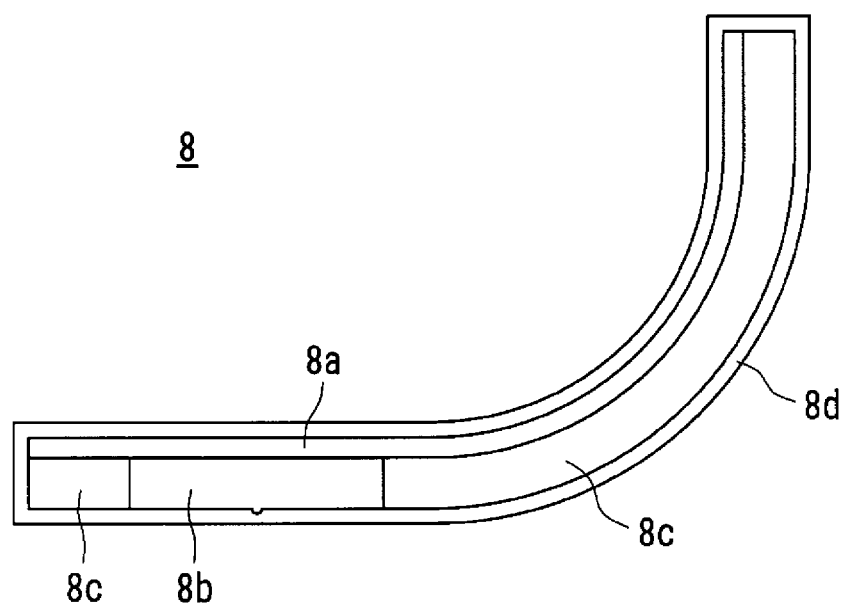
FIG. 6 is a schematic sectional view of a vertical bumper.

FIG. 6 is a schematic sectional view of a vertical bumper. In order to make it easier to see FIG. 6, the vertical bumper is not hatched.

Each vertical bumper 8 includes a supporting plate 8a that is mounted on a surface of the transporting section, a bumper sensor 8b and a shock absorbing member 8c that are arranged side by side on the supporting plate 8a, and an outer cover 8d that covers an outer periphery of the vertical bumper 8. In the present embodiment, each vertical bumper 8 extends over the front surface 3 and the side surface (the left side surface 5 or the right side surface 6).

Each supporting plate 8a is formed from, for example, a metal plate made of a metal, and, in the top view, has a substantially L shape and is bent (curved) along a corner of the moving body 1. Since the moving body 1 is rounded at the corners, each supporting plate 8a also has a shape corresponding to the shape of the moving body 1. Of each supporting plate 8a, the side that contacts the transporting section is sometimes called "rear surface", and the side opposite to the rear surface is sometimes called "front surface".

Each bumper sensor 8b is mounted on a surface of a portion of its corresponding supporting plate 8a along the front surface 3, and is a sensor that detects pressing. That is, each bumper sensor 8b detects that an object has collided with the vertical bumper 8 by an impact applied to the bumper sensor 8b.

Each shock absorbing member 8c covers the entire portion of the surface of its corresponding supporting plate 8a except where its corresponding bumper sensor 8b is provided. Each shock absorbing member 8c is, for example, a sponge, and softens the applied impact. It is desirable that the thickness of the shock absorbing members 8c be the same as the thickness of the bumper sensors 8b. That is, it is desirable that each vertical bumper 8 have a uniform thickness from a front-surface side to a rear-surface side. Since each shock absorbing member 8c is provided beside its corresponding bumper sensor 8b, the entire thickness can be made uniform.

Each outer cover 8d is made of, for example, a cloth, and is wound so as to cover the outer periphery of its corresponding vertical bumper 8.

Although not illustrated in detail, the structures of the above-described outer peripheral bumpers (the front bumper 13 and the rear bumper 14) are substantially the same as the structures of the vertical bumpers 8. However, it is desirable that the shock absorbing member of each outer peripheral bumper be thicker than the shock absorbing member 8c of each vertical bumper 8. As shown in, for example, FIG. 3A described above, each vertical bumper 8 is positioned inward of the front bumper 13, and is retreated in the rear direction L2. That is, in the top view, even if the front bumper 13 and the vertical bumpers 8 contact corresponding positions on the front surface 3, since the thickness of the front bumper 13 differs from the thicknesses of the vertical bumpers 8, the front bumper 13 protrudes outward.

The moving body 1 according to the present embodiment is, for example, used in restaurants or the like and operated by a waiter. The waiter loads, for example, dishes with food thereon onto a loading table of a loading section, and uses the operating terminal 50 to designate the vicinity of the table where a customer is seated as the destination. Then, the moving body 1 automatically moves to the designated destination by a travel mechanism of the drive housing 10, and a waiter waiting in the vicinity of the table takes out the dishes from the moving body 1 and serves the food to the customer. The method of use of the moving body 1 described above is one example, and transport objects or the like may be changed in accordance with the environment of use of the moving body 1.

In an environment where a large number of persons exist, such as restaurants, it is assumed that, not only obstacles that simply stand on the ground, but also obstacles that protrude to a height slightly away from the ground (such as a person's fingers) exist. Therefore, by providing the vertical bumpers 8, it is possible to soften impact when an object collides with the transporting section. Since, in a rectangular transporting section, collision with a corner portion is of great concern, it is possible to efficiently protect the transporting section by arranging the vertical bumpers 8 whose range in the height direction T is wide. That is, impact of an object that collides directly with the transporting section without coming into contact with the outer peripheral bumpers is softened by the vertical bumpers 8.

When changing the movement direction, the moving body 1 may move obliquely forward. Therefore, by covering the front surface 3 and the side surfaces by the vertical bumpers 8, it is possible to deal with not only forward collisions, but also side collisions.

As described above, the vertical bumpers 8 extend over the travel drive section and the transporting section. Therefore, it is possible soften impact produced by, not only collisions with the transporting section, but also collisions with the travel drive section.

In the present embodiment, a plurality of loading tables are provided to increase the carrying capacity of the transporting section. However, it is possible to protect each loading table by the vertical bumpers 8 whose range in the height direction T is wide.

In the moving body 1, by providing the outer peripheral bumpers, it is possible to mitigate collision of an object existing at a low position with the travel drive section. Since the outer peripheral bumpers protrude more than the vertical bumpers 8, there are greater situations in which the outer peripheral bumpers collide with an object. The assumed situations of collisions differ with each portion. Therefore, by causing positional relationships to differ in the top view and changing the probability of collision, it becomes easier to individually set the behavior of the moving body 1 after the collision. Further, by causing the thickness of the shock absorbing member 8c of each outer peripheral bumper to differ from the thickness of the shock absorbing member 8c of each vertical bumper 8, the outer peripheral bumpers and the vertical bumpers 8 are capable of serving different functions. That is, by using shock absorbing members 8c having small thicknesses for the vertical bumpers 8, even small impacts can be detected with good sensitivity. By using shock absorbing members having large thicknesses for the outer peripheral bumpers, even large impacts can be reliably softened.

As shown in FIG. 3B described above, the front stop button 7a is disposed between the two vertical bumpers 8 at the two corner portions. By providing the front stop button 7a in this way, a user can quickly stop the moving body 1 in an emergency.

The front stop button 7a is disposed at a position that overlaps an upper end portion of each vertical bumper 8 in the height direction T. When the front stop button 7a is disposed at a height near the upper end portion of each vertical bumper 8, it is possible to ensure an appropriate height from the ground and to position the front stop button 7a where a user can easily operate the front stop button 7a in an emergency.

An ineffective region that does not detect a collision is set at the end portion of each vertical bumper 8 in the height direction T. The front stop button 7a is disposed at a position that overlaps the ineffective region of each vertical bumper 8. In an emergency, a user operates the front stop button 7a. However, since the vertical bumpers 8 are provided along with the front stop button 7a on the front surface 3 of the moving body 1, there is concern that there might be users that try to stop the moving body 1 by pressing the vertical bumpers 8. When the ineffective regions are set at the vertical bumpers 8, it is difficult to distinguish between the ineffective regions and the regions other than the ineffective regions in terms of appearance. Therefore, even if the moving body 1 does not stop when the user accidentally continues pressing the ineffective region at each vertical bumper 8, when the front stop button 7a is provided beside the ineffective regions, it is possible to guide the user to operate the front stop button 7a that comes into view.

The front stop button 7a is provided further towards an end portion of the transporting section than the center whose vicinity is wide open. Therefore, the front stop button 7a is disposed so as not to hinder operation while not allowing only the front stop button 7a to stand out too much. Since the front stop button 7a is provided on the front surface 3 of the moving body 1, the moving body 1 approaches a user on the front-surface-3 side, so that the user can instantly operate the front stop button 7a.

Although, in the present embodiment, the structure in which the vertical bumpers 8 are mounted on only the front surface 3 is described, other structures are possible. A vertical bumper 8 may be mounted on the rear surface 4. This makes it possible to provide against rearward collisions.

Figure 7A:
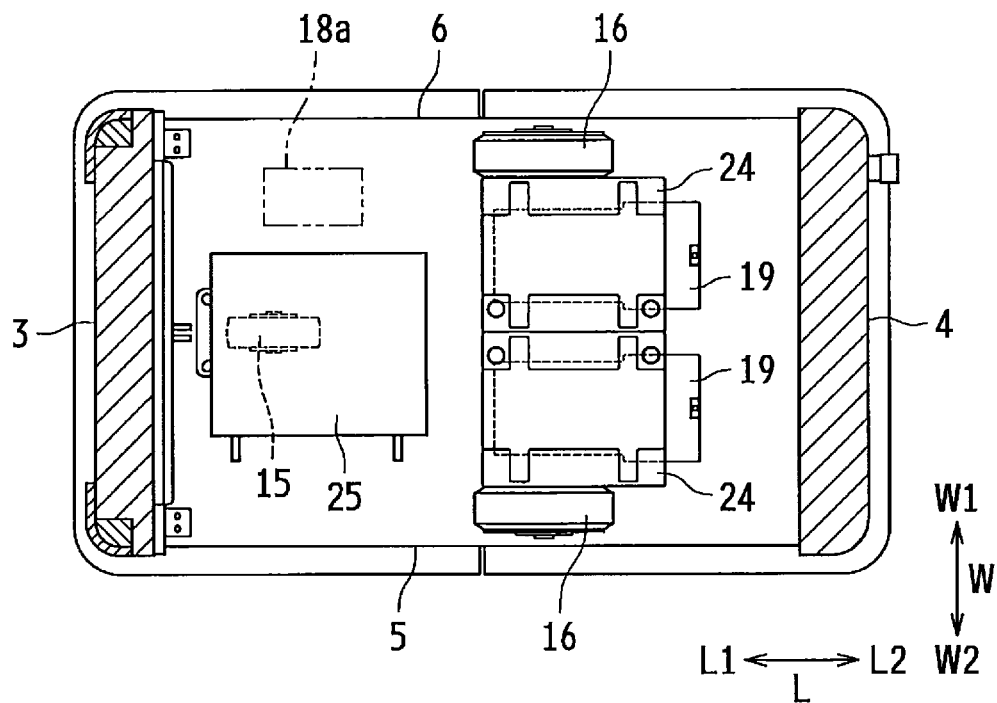
FIG. 7A is a schematic top view of an internal structure of a drive housing and an internal structure of a power housing.
Figure 7B:
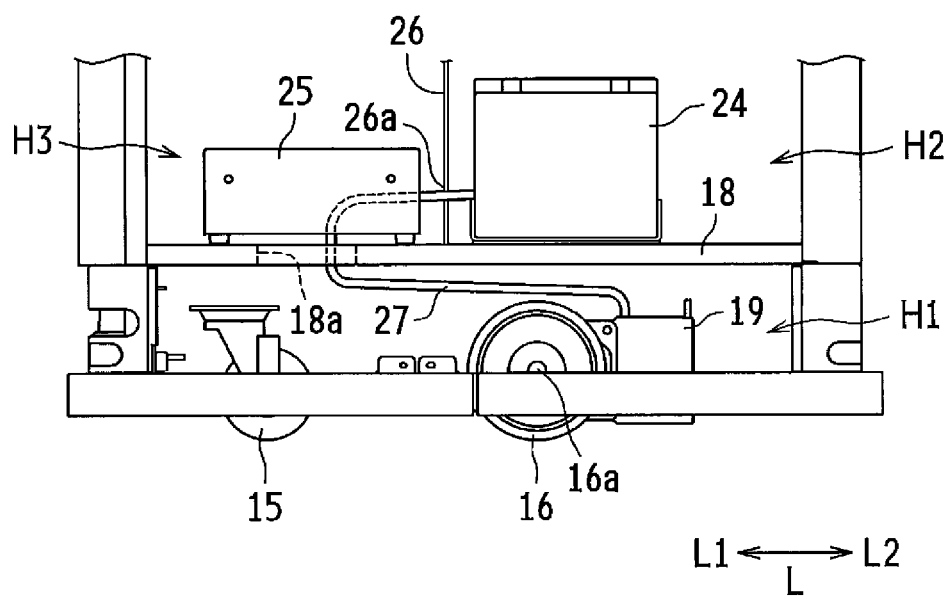
FIG. 7B is a schematic side view of the internal structure of the drive housing and the internal structure of the power housing.
Figure 7C:
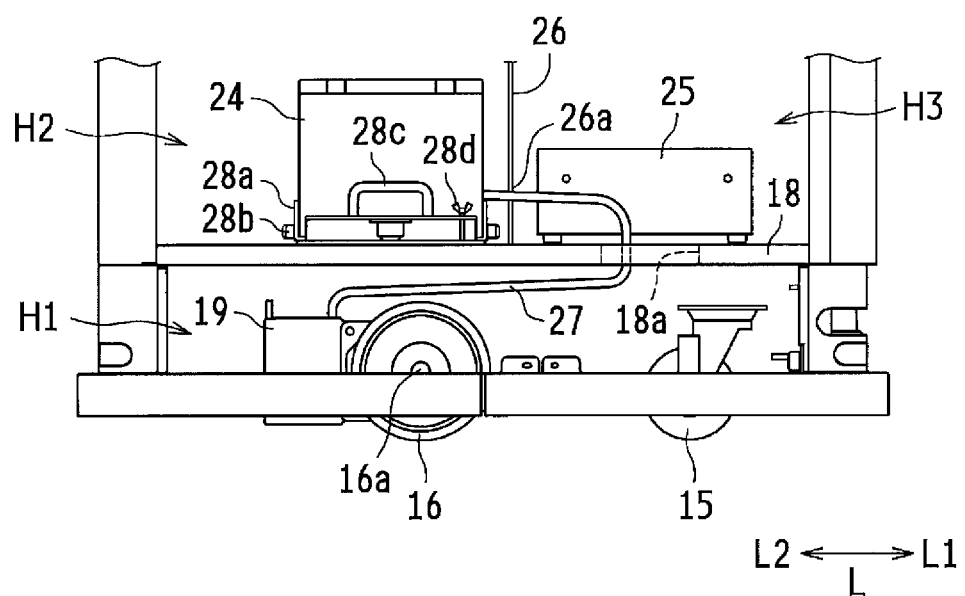
FIG. 7C is a schematic side view of the internal structure of the drive housing and the internal structure of the power housing when seen from a side opposite to the side from which the internal structures are seen in FIG. 7B.

FIG. 7A is a schematic top view of an internal structure of the drive housing and an internal structure of the power housing. FIG. 7B is a schematic side view of the internal structure of the drive housing and the internal structure of the power housing. FIG. 7C is a schematic side view of the internal structure of the drive housing and the internal structure of the power housing when seen from a side opposite to the side from which the internal structures are seen in FIG. 7B. In order to make it easier to see FIG. 7A, FIG. 7A does not show, for example, the drive upper surface 18 that separates the drive housing 10 and the power housing 20, and components other than the main sections. In order to make it easier to see FIG. 7B and FIG. 7C, FIG. 7B and FIG. 7C do not show, for example, the side-surface door 21 that covers the left side surface 5 and the right side surface 6, and components other than the main sections. Accordingly, FIG. 7B and FIG. 7C allow the interior to be seen.

As described above, two drive wheels 16 are provided at the drive housing 10. Specifically, in the length directions L, the two drive wheels 16 are disposed slightly in the rear direction L2 than the center of the moving body 1; and, in the width directions W, are disposed near the left side surface 5 or near the right side surface 6 so as to be apart from each other. Two motors 19 are provided between the two drive wheels 16, each motor 19 being connected to its corresponding drive wheel 16 via a drive shaft 16a. Each connector 27 extending from its corresponding battery 24 is connected to its corresponding motor 19.

The driven wheel 15 is provided at the drive housing 10. In the length directions L, the driven wheel 15 is disposed towards the front surface 3 than the center of the moving body 1 and, in the width directions W, is disposed in the center.

The drive wheels 16 are rotated by being driven by the motors 19. The driven wheel 15 is rotated in accordance with the movement of the moving body 1. The drive wheels 16 and the driven wheel 15 may be formed such that either the drive wheels 16 or the driven wheel 15 changes its orientation, or such that both the drive wheels 16 and the driven wheel 15 change their orientations. By changing the orientation of the drive wheels 16 or the driven wheel 15, it is possible to change the direction of travel of the moving body 1.

The drive upper surface 18 (an example of a wall portion) that separates the drive housing 10 and the power housing 20 from each other is the upper surface of the drive housing 10 and is also a lower surface of the power housing 20. A portion below the drive upper surface 18 corresponds to a base portion H1.

The inside of the power housing 20 is roughly divided in two by a partition wall 26 (an example of a wall portion) provided in the center of the power housing 20 in the length directions L. A rear-direction-L2 side of the partition wall 26 is a power supply portion H2 and accommodates the two batteries 24. A front-direction-L1 side of the partition wall 26 is a charging accommodating portion H3 and accommodates the charger 25.

The two batteries 24 are disposed above their corresponding drive shafts 16a, and, in the width directions W, have a length that is substantially the same as the distance between the two drive wheels 16. By aligning the center of gravity of each battery 24 with its corresponding drive shaft 16a, it is possible to reduce load unevenness and stably drive the moving body 1. In addition, by adjusting the length of the batteries 24 to the interval between the two drive wheels 16, it is possible to reduce load unevenness in the width directions W.

The charger 25 is provided in substantially the center in the width directions W and is disposed above the driven wheel 15. By aligning the center of gravity of the charger 25 with the driven wheel 15 and reducing load unevenness, it is possible to stably bring the driven wheel 15 into contact with the ground.

The connection opening 18a described above is provided in the charging accommodating portion H3. The connectors 27 that extend from the two batteries 24 pass through the charging accommodating portion H3 via connector holes 26a of the partition wall 26, and extend up to the respective motors 19 via the connection opening 18a. Therefore, by providing the connection opening 18a in the charging accommodating portion H3 that has a relatively free space compared to the power supply portion H2, it is possible to avoid increasing the size of the power supply portion H2 and to efficiently dispose the connection opening 18a.

The above-described side-surface door 21 is provided at a position where a left side surface of the charging accommodating portion H3 is covered by the side-surface door 21. That is, by providing the side-surface door 21, it is possible to easily connect, for example, a wire to the charger 25 and to improve workability in charging operations that are repeatedly performed.

As shown in FIG. 7B, the power supply portion H2 and the charging accommodating portion H3 are separated from the base portion H1 by the drive upper surface 18, and are arranged side by side in the direction of travel (length direction L) above the base portion H1. Due to such an arrangement, it is possible to properly accommodate components that are indispensable to the moving body 1 while avoiding an increase in size of the moving body 1 by effectively using the space.

As shown in FIG. 7C, the batteries 24 are placed in the power supply portion H2 via slide tables 28a. Holding portions 28c for being held by a user and rails 28b are mounted on the corresponding slide tables 28a. The slide tables 28a are fixed to the drive upper surface 18 by tightening tools 28d. When a user replaces the batteries 24, first, the user removes the right panel 23 and loosens the tightening tools 28d. By loosening the tightening tools 28d, the slide tables 28a are released from the drive upper surface 18. When the user holds the holding portions 28c and pulls the slide tables 28a, the slide tables 28a are guided by the rails 28b and are pulled out of the right side surface 6. After replacing the batteries 24, batteries 24 are pushed into the power supply portion H2 by performing the procedure for taking out the batteries 24 in the reverse order. Although, in the present embodiment, the structure including, for example, the slide tables 28a is described, the structure is not limited thereto. Any structures may be used as long as they allow the batteries 24 to be taken out from a side surface of the moving body 1. By using the structure in which the batteries 24 are taken out of the moving body 1, it is possible to increase workability in performing a replacement operation, and, in the inside of the moving body 1, it is possible not to provide a space that is provided in consideration of, for example, the replacement operation, so that the moving body 1 is effectively reduced in size.

Figure 8:
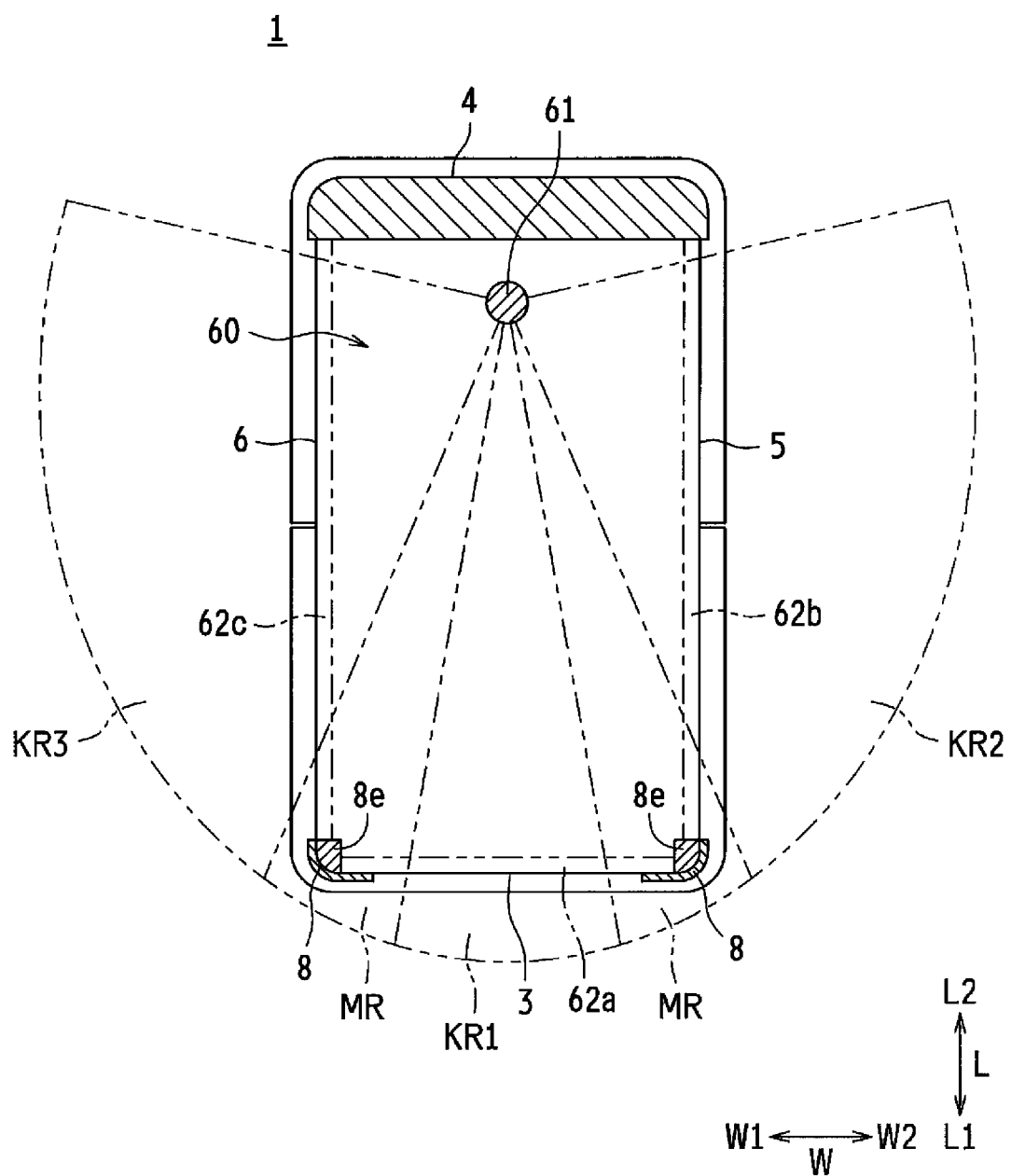
FIG. 8 is a schematic sectional view along arrows VIII-VIII of FIG. 3B.

FIG. 8 is a schematic sectional view along arrows VIII-VIII of FIG. 3B.

FIG. 8 shows a cross section at the height of the sensor accommodating section 60, and schematically shows a detection range of the wide-area sensor 61. Since the wide-area sensor 61 has a structure that applies light in a substantially horizontal direction, each portion of the moving body 1 that is positioned at this height is described below. The rear-surface-4-side inside wall is provided behind the wide-area sensor 61. The vertical bumpers 8 that are provided at the corner portions of the moving body 1 and supporting columns 8e for fixing the vertical bumpers 8 are provided in front of the wide-area sensor 61.

Specifically, the sensor accommodating section 60 is a space having a narrow interval between the upper surface (the power upper surface 20a) of the power housing 20 and the lower surface (the first loading table 31) of the transporting section, which are provided side by side in the horizontal directions. The sensor accommodating section 60 has a structure that, excluding a part of each supporting column 8e for supporting the load of the vertical bumpers 8 and the transporting section, does not have portions that intercept light applied from the wide-area sensor 61, and that includes side-surface portions that are optically open towards the outside via the front-surface opening portion 62a, the left opening portion 62b, and the right opening portion 62c. In the present embodiment, in accordance with the direction of application of light of the wide-area sensor 61, the shape of each opening portion is a slit-like shape extending in the horizontal directions. The shape of each opening portion is not limited to the above-described shape. For example, the opening portions may have a shape defined by a plurality of hole-like portions that are formed consecutively in the horizontal directions, or may have a shape in which a part of the slit-like shape is closed.

In the top view, the wide-area sensor 61 has its fan-shaped light-application range set such that light is applied to portions other than the rear-surface-4-side inside wall. Light applied towards the front surface 3 passes through the front-surface opening portion 62a and is emitted to the outside of the moving body 1, and is set to define a first detection region KR1 for detecting an obstacle in front of the moving body 1. Light applied towards the left side surface 5 passes through the left opening portion 62b and is emitted to the outside of the moving body 1 via the left opening portion 62b, and is set to define a second detection region KR2 for detecting an obstacle on the left of the moving body 1 and an obstacle on the left front of the moving body 1. Light applied towards the right side surface 6 passes through the right opening portion 62c and is emitted to the outside of the moving body 1, and is set to define a third detection region KR3 for detecting an obstacle on the right of the moving body 1 and an obstacle on the right front of the moving body 1. Of the lights applied from the wide-area sensor 61, a range in which light is applied to the vertical bumpers 8 and the supporting columns 8e is defined as an ineffective region MR where detection is not performed.

In the present embodiment, two opening portions (the left opening portion 62b and the right opening portion 62c) are provided on respective side surfaces of the moving body 1, and one wide-area sensor 61 is capable of detecting an obstacle in a wide angular range including both sides of the moving body 1 itself. The front-surface opening portion 62a is provided on the front-surface-3 side of the moving body 1, so that obstacles on the sides of three surfaces of the moving body 1, that is, on the sides of both side surfaces of the moving body 1 and on the side of the front surface of the moving body 1 can be detected. Further, by disposing the wide-area sensor 61 towards the rear-direction-L2 side, it is possible to set a wide detection range with respect to the side surfaces including obliquely front portions. The sensor accommodating section 60 may have an opening portion on the rear-surface side. This makes it possible to detect an obstacle that is positioned behind the moving body 1. In this case, instead of the front-surface opening portion 62a, an opening portion may be provided on the rear-surface side, or an opening portion may be provided on the rear-surface side while the front-surface opening portion 62a is provided.

As described above, the sensor accommodating section 60 is interposed between the power upper surface 20a and the first loading table 31, and includes the wide-area sensor 61 and the emission window portions from which light is emitted. Therefore, since the wide-area sensor 61 is accommodated in the moving body 1, it is possible to reduce, for example, staining or scratching of the wide-area sensor 61. Since the wide-area sensor 61 is provided at a position between the travel drive section and the transporting section, it is possible to detect an obstacle that faces a side surface of the moving body 1 and that is at a lower height than the upper surface 2 of the moving body 1, while reducing the width of the sensor accommodating section 60 in the height direction T.

It is desirable that the width of the sensor accommodating section 60 in the height direction T be less than or equal to 20 cm. When the width of the sensor accommodating section 60 in the height direction T is reduced, it is possible to reduce the size of the moving body 1 and the width may be 5 cm or less. However, when the width of the sensor accommodating section 60 in the height direction T is made very small, a part of the light (illumination light) applied from the wide-area sensor 61 may illuminate the upper surface of the power housing 20 or the lower surface of the transporting section. Therefore, it is desirable that the upper surface of the power housing 20 and/or the lower surface of the transporting section be formed so as to absorb the illumination light. For example, the upper surface of the power housing 20 and/or the lower surface of the transporting section may be made of, for example, a material having a characteristic that absorbs the illumination light, such as a black material, or may be coated.

The wide-area sensor 61 performs a scanning operation using light, and emits the light from the left opening portion 62b, the right opening portion 62c, and the front-surface opening portion 62a. That is, instead of using a plurality of sensors, light applied from one wide-area sensor 61 is used for the scanning operation to make it possible to set a wide detection range, reduce the number of components, and simplify the structure.

The left opening portion 62b, the right opening portion 62c, and the front-surface opening portion 62a may be covered by a transmitting member that transmits light applied from the wide-area sensor 61. In the structure in which the emission window portions are covered by a transmitting member, it is possible to reliably reduce, for example, staining or scratching of the wide-area sensor 61 without hindering the emission of light.

Figure 9:
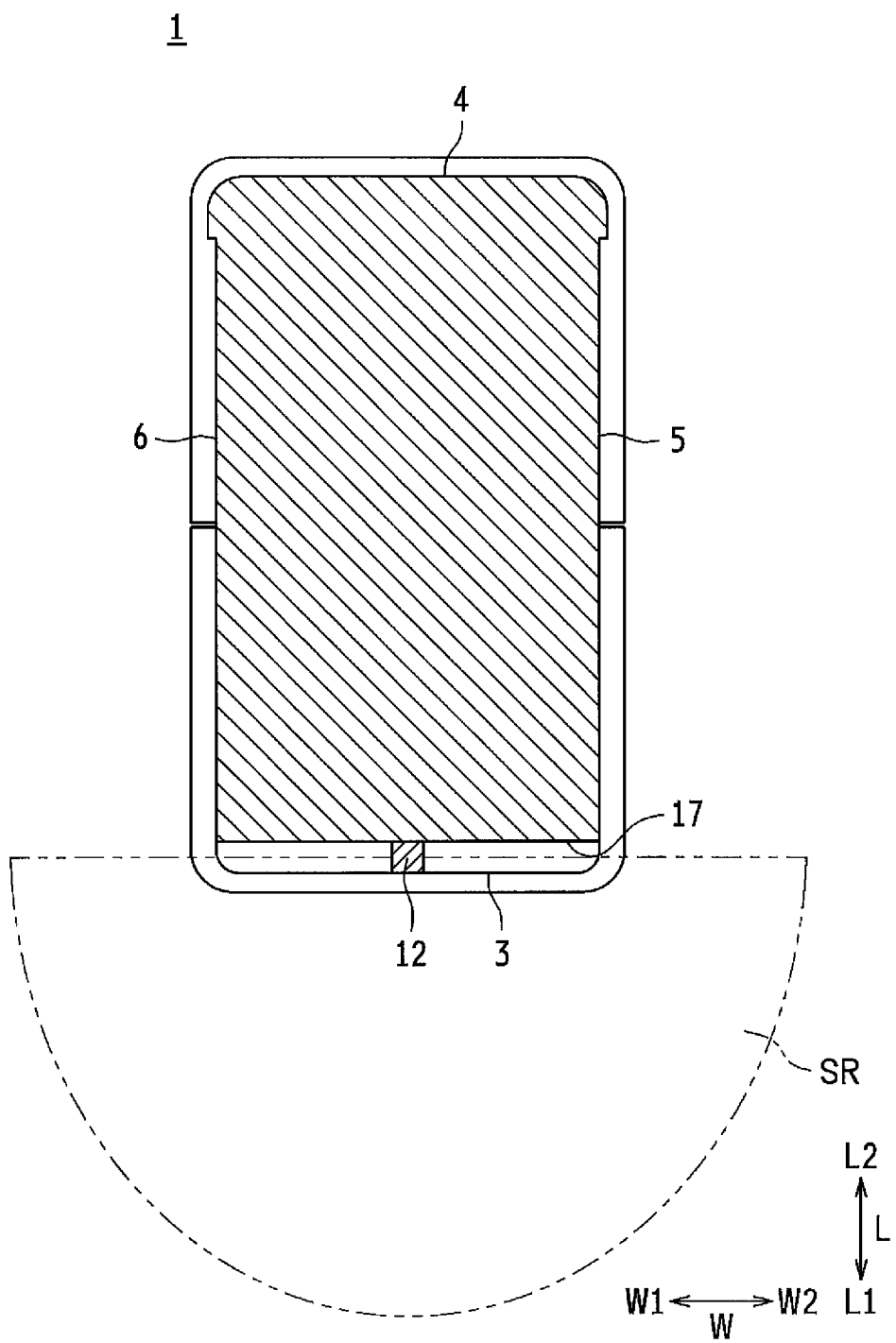
FIG. 9 is a schematic sectional view along arrows IX-IX of FIG. 3B.

FIG. 9 is a schematic sectional view along arrows IX-IX of FIG. 3B.

FIG. 9 shows a cross section at the height of the front-surface sensor 12, and schematically shows a detection range of the front-surface sensor 12. As shown in FIG. 9, by providing the front-surface recessed portion 17, a side of the front-surface sensor 12 is exposed. The front-surface sensor 12 has its fan-shaped lower detection region SR set such that light is applied in the forward direction including the sides of the front-surface sensor 12. That is, in the moving body 1, the front-surface sensor 12 set in the direction of travel is capable of detecting an obstacle that interferes with the movement, and the wide-area sensor 61 is capable of detecting an obstacle that protrudes at a height slightly away from the ground. Specifically, in the moving body 1, the height to the upper surface 2 is approximately 90 cm, the detection height at the wide-area sensor 61 is approximately 44 cm, and the detection height at the front-surface sensor 12 is approximately 13 cm. Although, in FIG. 8 and FIG. 9, in order to make it easier to see the figures, the detection area of the wide-area sensor 61 and the detection area of the front-surface sensor 12 are shown as being restricted to ranges including the vicinity of the moving body 1. However, actually, the detection areas may be ranges up to where the applied light reaches, so that the detection areas may be made wide.

Second Embodiment

Next, a moving body 1 according to a second embodiment of the present disclosure is described with reference to the drawings. Structural elements having functions corresponding to those of the first embodiment are given the same reference numerals and are not described below.

Figure 10A:
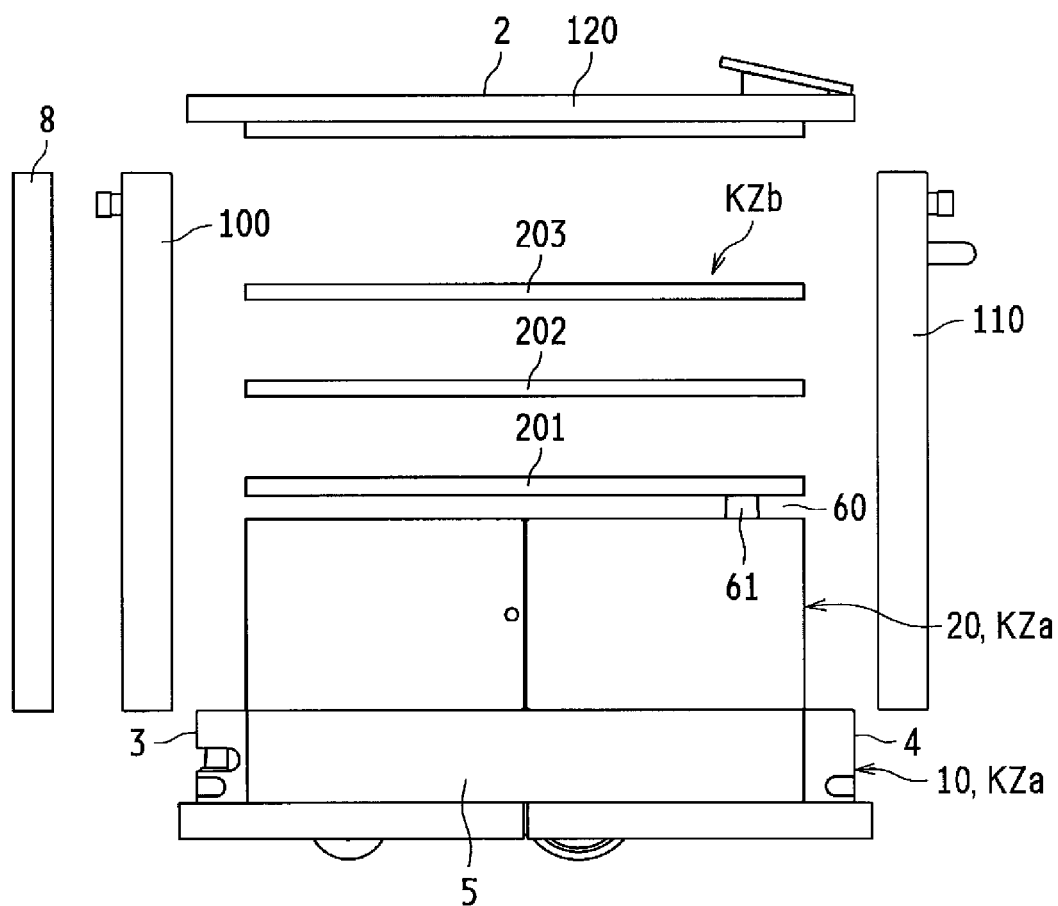
FIG. 10A is an explanatory side view of a state in which each portion of a moving body according to a second embodiment of the present disclosure is separated.
Figure 10B:
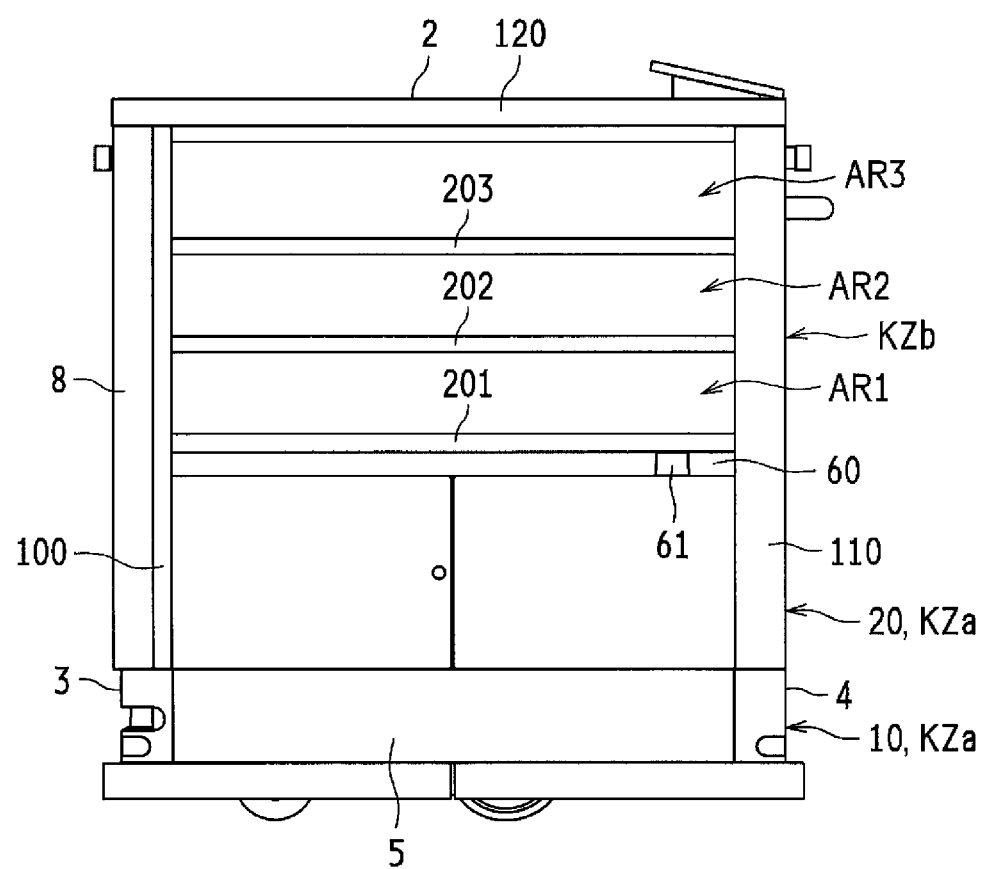
FIG. 10B is an explanatory side view of a state in which each portion of the moving body shown in FIG. 10A is assembled.

FIG. 10A is an explanatory side view of a state in which each portion of the moving body according to the second embodiment of the present disclosure is separated. FIG. 10B is an explanatory side view of a state in which each portion of the moving body shown in FIG. 10A is assembled.

FIG. 10A shows a state in which a front wall portion 100, a rear wall portion 110, an upper wall portion 120, and a vertical bumper 8 are removed from a drive housing 10 and a power housing 20, the drive housing 10 and the power housing 20 corresponding to a lower structural body Kza. The second embodiment differs from the first embodiment in the structures of the front wall portion 100, the rear wall portion 110, and the vertical bumper 8. In the first embodiment, the front wall portions 100, the rear wall portions 110, and the vertical bumpers 8 are separated in accordance with each housing. In contrast, in the present embodiment, the front wall portion 100, the rear wall portion 110, and the vertical bumper 8 each have an integrated structure so as to be formed continuously in the height direction T, and are linked from portions facing the power housing 20 (lower end portions) to portions contacting the upper wall portion 120 (upper end portions).

A lower loading table 201, an intermediate loading table 202, and an upper loading table 203 are provided in this order from the bottom at a portion corresponding to an upper structural body KZb provided above a sensor accommodating section 60. The lower loading table 201, the intermediate loading table 202, and the upper loading table 203 are similar to the first loading table 31 and the second loading table 41, have a flat shape, and are for loading transport objects thereon. As shown in FIG. 10B, when the front wall portion 100, the rear wall portion 110, the upper wall portion 120, and the vertical bumper 8 have been mounted on the drive housing 10 and the power housing 20, the lower loading table 201, the intermediate loading table 202, and the upper loading table 203 are fixed to the front wall portion 100 and the rear wall portion 110. When each portion has been assembled, in the height direction T, a first loading region AR1 is provided between the lower loading table 201 and the intermediate loading table 202, a second loading region AR2 is provided between the intermediate loading table 202 and the upper loading table 203, and a third loading region AR3 is provided between the upper loading table 203 and the upper wall portion 120.

In the present embodiment, the upper structural body KZb is formed by assembling each portion, such as the front wall portion 100 and the lower loading table 201, and a lower surface of the upper structural body KZb corresponds to the lower loading table 201. In the present embodiment, although three loading tables, that is, the lower loading table 201, the intermediate loading table 202, and the upper loading table 203 are provided, the number of loading tables is not limited thereto, so that the number of loading tables may be changed as appropriate. The heights at which the lower loading table 201, the intermediate loading table 202, and the upper loading table 203 are arranged can be adjusted as appropriate, so that the widths of the first loading region AR1, the second loading region AR2, and the third loading region AR3 in the height direction T may differ from each other. Although FIG. 10A shows the front wall portion 100 and the rear wall portion 110 that are continuous from the portions where they face the power housing 20 (the lower end portions) to the portions where they contact the upper wall portion 120 (the upper end portions), the front wall portion 100 and the rear wall portion 110 are not limited thereto and may be divided as appropriate. For example, the portions facing the power housing 20 and the portions thereabove may be divided, or only the portions corresponding to the upper structural body KZb may have an integrated structure.

Third Embodiment

Next, a moving body 1 according to a third embodiment of the present disclosure is described with reference to the drawings. Structural elements having functions corresponding to those of the first and second embodiments are given the same reference numerals and are not described below.

Figure 11A:
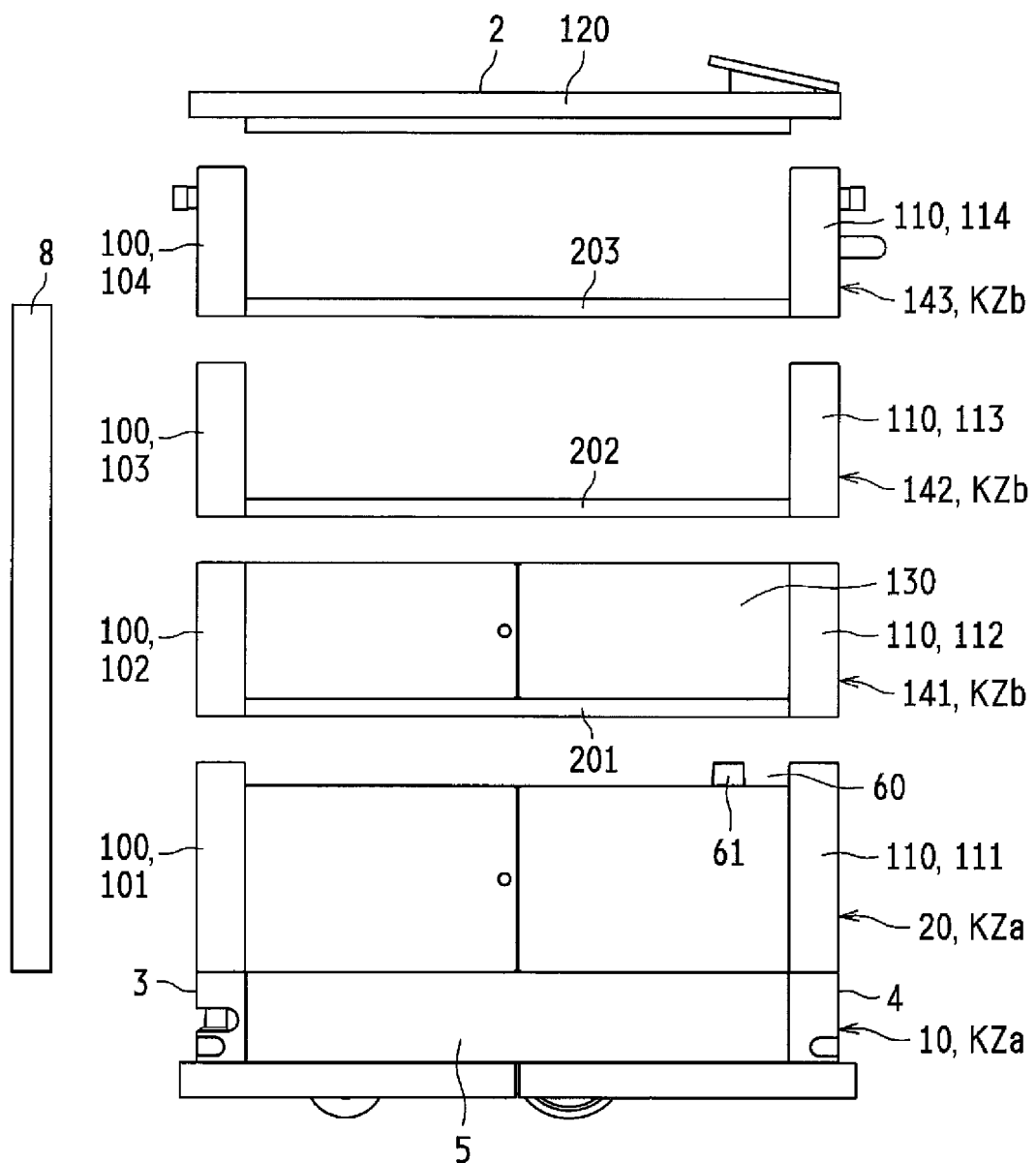
FIG. 11A is an explanatory side view of a state in which each portion of a moving body according to a third embodiment of the present disclosure is separated.
Figure 11B:
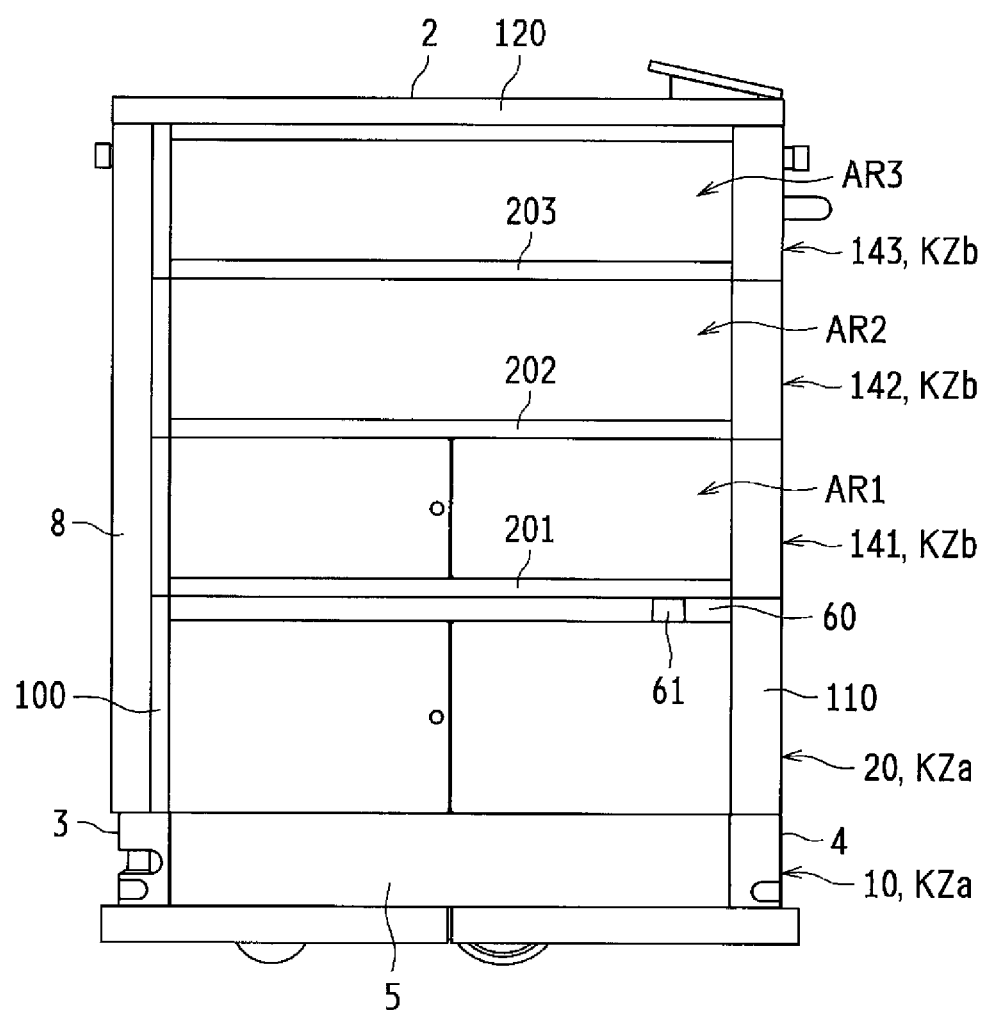
FIG. 11B is an explanatory side view of a state in which each portion of the moving body shown in FIG. 11A is assembled.

FIG. 11A is an explanatory side view of a state in which each portion of the moving body according to the third embodiment of the present disclosure is separated. FIG. 11B is an explanatory side view of a state in which each portion of the moving body shown in FIG. 11A is assembled.

FIG. 11A shows a state in which, in the moving body 1 according to the third embodiment, for example, a drive housing 10, a power housing 20, a first upper housing 141, a second upper housing 142, a third upper housing 143, and a vertical bumper 8 are separated from each other. Although the third embodiment is the same as the first embodiment in that a plurality of layers (housings) are stacked upon each other, the third embodiment differs from the first embodiment in that the vertical bumper 8 is continuous in the height direction T. Specifically, front wall portions 100 are separated in four, that is, a first front wall 101 to a fourth front wall 104, and rear wall portions 110 are separated in four, that is, a first rear wall 111 to a fourth rear wall 114.

The structures of the drive housing 10 and the power housing 20 are substantially the same as those of the first embodiment, and the first front wall 101 and the first rear wall 111 are mounted on the power housing 20.

The first upper housing 141 includes a second front wall 102, a second rear wall 112, a lower loading table 201, and a member accommodating section 130. That is, the lower loading table 201 is mounted on a lower portion of the second front wall 102 and a lower portion of the second rear wall 112, and the member accommodating section 130 is disposed above the lower loading table 201. The member accommodating section 130 accommodates members that are selected as appropriate in accordance with the environment of use of the moving body 1, such as auxiliary batteries or dishes. The member accommodating section 130 and the lower loading table 201 may be integrated with each other, and a lower surface of the member accommodating section 130 may correspond with a lower surface of the upper structural body KZb. The member accommodating section 130 may have an openable-and-closable door, or its side surface may be covered by, for example, a panel.

The second upper housing 142 includes a third front wall 103, a third rear wall 113, and an intermediate loading table 202. The intermediate loading table 202 is mounted on a lower portion of the third front wall 103 and a lower portion of the third rear wall 113. The third upper housing 143 includes a fourth front wall 104, a fourth rear wall 114, and an upper loading table 203. The upper loading table 203 is mounted on a lower portion of the fourth front wall 104 and a lower portion of the fourth rear wall 114. The upper wall portion 120 is mounted on a top portion of the third upper housing 143. When each portion has been assembled, in the height direction T, a first loading region AR1 is provided between the lower loading table 201 and the intermediate loading table 202, a second loading region AR2 is provided between the intermediate loading table 202 and the upper loading table 203, and a third loading region AR3 is provided between the upper loading table 203 and the upper wall portion 120.

In the present embodiment, after the drive housing 10, the power housing 20, the first upper housing 141, the second upper housing 142, and the third upper housing 143 have been stacked upon each other, the vertical bumper 8 is mounted along the first front wall 101 to the fourth front wall 104. In this structure, it is possible to easily change the number of layers to be stacked upon each other, and the vertical bumper 8 having a height in accordance with the height of the housings may be mounted as appropriate.

Although FIG. 11B shows a structure in which the member accommodating section 130 is provided at the first upper housing 141, the structure is not limited thereto, so that a structure in which a member accommodating section 130 is not provided may be used, or a structure in which the member accommodating section 130 is mounted on the second upper housing 142 or the third upper housing 143 may be used.

The embodiments disclosed herein are examples in all respects, and are not a basis for limitative interpretation. Accordingly, the technical scope of the disclosure is not to be interpreted by only the above-described embodiments, and is to be defined based on the descriptions of the claims. In addition, all changes within the scope of the claims and meanings equivalent to the claims are included.

The present disclosure contains subject matter related to that disclosed in Japanese Priority Patent Application JP 2018-053266 filed in the Japan Patent Office on Mar. 20, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A moving body comprising:
a travel drive section; and
a transporting section that is disposed above the travel drive section,
wherein the transporting section has a rectangular shape having long and short sides, and vertical bumpers are provided at adjacent corner portions across one of the short sides, each of the vertical bumpers extending in a height direction,
wherein an emergency stop button is disposed between the vertical bumpers that are provided at the adjacent corner portions,
wherein an ineffective region is previously set at each of the vertical bumpers, the ineffective region being where detection of a collision is ineffective, and
wherein the emergency stop button is disposed at a position that overlaps the ineffective region of each of the vertical bumpers in the height direction.

2. The moving body according to claim 1, wherein the transporting section includes a front surface and a rear surface that face each other in a direction of travel, and a side surface that is provided between the front surface and the rear surface, and
wherein each of the vertical bumpers extends over the front surface and the side surface.

3. The moving body according to claim 1, wherein each of the vertical bumpers includes a supporting plate that is mounted on a surface of the transporting section, and a sensor and a shock absorbing member that are arranged side by side on the supporting plate.

4. The moving body according to claim 1, wherein each of the vertical bumpers extends over the travel drive section and the transporting section in the height direction.

5. The moving body according to claim 1, wherein the transporting section includes a plurality of loading tables that are arranged apart from each other in the height direction, and
wherein each of the vertical bumpers extends over the plurality of loading tables.

6. The moving body according to claim 1, wherein the travel drive section is provided with an outer peripheral bumper that surrounds an outer periphery of the travel drive section in the top view.

7. The moving body according to claim 6, wherein each of the vertical bumpers is positioned inward of the outer peripheral bumper in the top view.

8. The moving body according to claim 6, wherein the outer peripheral bumper includes a supporting plate that is mounted on a surface of the travel drive section, and a sensor and a shock absorbing member that are arranged side by side on the supporting plate.

9. The moving body according to claim 8, wherein the vertical bumpers include a shock absorbing member, and
wherein a thickness of the shock absorbing member of each of the vertical bumpers is less than a thickness of the shock absorbing member of the outer peripheral bumper.

10. The moving body according to claim 1, wherein the emergency stop button is disposed at a position that overlaps an upper end portion of each of the vertical bumpers in the height direction.

11. The moving body according to claim 1, wherein the emergency stop button is disposed near an end portion of the transporting section in the width direction.

12. The moving body according to claim 1, wherein the emergency stop button is disposed on a front surface of the transporting section in a direction of travel.

* * * * *